United States Patent
Kitamura

(10) Patent No.: US 7,489,435 B2
(45) Date of Patent: Feb. 10, 2009

(54) OPTICAL ELEMENT

(75) Inventor: Mitsuru Kitamura, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 8 days.

(21) Appl. No.: 11/799,082

(22) Filed: Apr. 30, 2007

(65) Prior Publication Data

US 2007/0285750 A1    Dec. 13, 2007

Related U.S. Application Data

(62) Division of application No. 11/042,798, filed on Jan. 25, 2005, now Pat. No. 7,221,496.

(30) Foreign Application Priority Data

Feb. 2, 2004    (JP) .............................. 2004-025010

(51) Int. Cl.
    *G02B 26/00* (2006.01)
(52) U.S. Cl. .......................... 359/290; 359/315; 359/11
(58) Field of Classification Search .................. 359/290
    See application file for complete search history.

(56) References Cited

U.S. PATENT DOCUMENTS

| | | | |
|---|---|---|---|
| 3,957,353 A | 5/1976 | Fienup et al. | |
| 4,109,996 A | 8/1978 | Ersoy | |
| 5,285,308 A | 2/1994 | Jenkins et al. | |
| 5,497,254 A | 3/1996 | Amako et al. | |
| 5,751,243 A | 5/1998 | Turpin | |
| 5,949,569 A | 9/1999 | Shimura | |
| 6,026,053 A | 2/2000 | Satorius | |
| 6,301,000 B1 | 10/2001 | Johnson | |
| 6,618,190 B2 | 9/2003 | Kitamura et al. | |
| 2004/0145789 A1 | 7/2004 | Kitamura et al. | |

*Primary Examiner*—Jessica T Stultz
(74) *Attorney, Agent, or Firm*—Ladas and Parry LLP

(57) ABSTRACT

A complex amplitude type spatial optical modulation element, with which the amount of generation of 0th-order diffraction light is low. An optical element is arranged by aligning a plurality of three dimensional cells C1(x, y) two dimensionally on an XY plane. Each individual cell is made of a light transmitting material and has a specific amplitude and a specific phase defined therein. The individual cell has a specific optical characteristic such that when predetermined incident light is provided from the upper surface of the cell, reflection emitted light, with which amplitude and phase of the incident light have been changed in accordance with the specific amplitude and the specific phase defined in the cell, is obtained from the upper surface of the cell.

4 Claims, 20 Drawing Sheets

$A_{out} = A_{in} \cdot A(x,y)$
$\theta_{out} = \theta_{in} \pm \theta(x,y)$ n1~n4 : REFRACTIVE INDEX

| ⊚MAXIMUM DEPTH OF GROOVE G : $dmax = \dfrac{\lambda}{|n1-n2|}$ ||
|---|---|
| ⊚DEPTH OF GROOVE G FOR A SPECIFIC CELL C(x,y) : ||
| (1) | IF $n1 > n2$ <br><br> $d(x,y) = \dfrac{\lambda \cdot \theta(x,y)}{2(n1-n2)\pi}$ |
| (2) | IF $n1 < n2$ <br><br> $d(x,y) = dmax - \dfrac{\lambda \cdot \theta(x,y)}{2(n2-n1)\pi}$ |

Fig.13

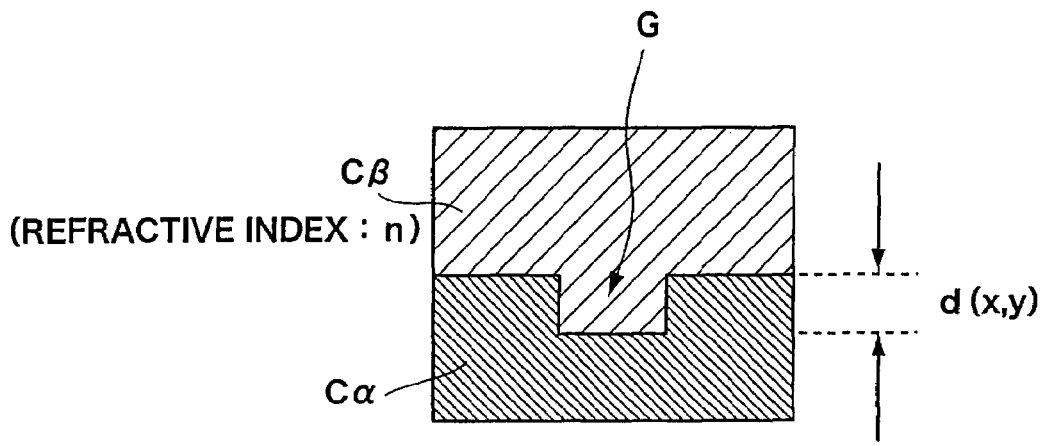

| ◎ MAXIMUM DEPTH OF GROOVE G : $dmax = \dfrac{\lambda}{2n}$ |
|---|
| ◎ DEPTH OF GROOVE G FOR A SPECIFIC CELL C(x,y) : $d(x,y) = \dfrac{\lambda \cdot \theta(x,y)}{4n\pi}$ |
| ESPECIALLY, WHEN PROTECTIVE LAYER C$\beta$ IS REPLACED BY AIR LAYER, APPROXIMATION n = 1 IS MADE. |
| ◎ MAXIMUM DEPTH OF GROOVE G : $dmax = \dfrac{\lambda}{2}$ |
| ◎ DEPTH OF GROOVE G FOR A SPECIFIC CELL C(x,y) : $d(x,y) = \dfrac{\lambda \cdot \theta(x,y)}{4\pi}$ |

OPTICAL ELEMENT

This application is a divisional of application number 11/042,798,filed Jan.25, 2005now U.S. Pat. No.7,221,496, claims the benefit thereof and incorporates the same by reference.

BACKGROUND OF THE INVENTION

The present invention relates to an optical element and, more particularly, relates to an optical element suitable for constructing a complex amplitude type spatial optical modulator by assembling a lot of three-dimensional cells and for recording a stereoscopic image as a hologram.

A holographic technique is conventionally known as a method for recording a stereoscopic image on a medium and reconstructing this image. A hologram produced by this method is used in various fields, such as ornamental art or anti-counterfeit seals. In order to optically produce the hologram, it is common to record the interference fringe between object light reflected from an object and reference light on a photosensitive medium. A laser beam superior in coherence is usually used as a light source for the object light and the reference light. Generally, the motion of electromagnetic radiation, such as light, can be regarded as the propagation of a wave front provided with amplitude and a phase, and it can be said that the hologram is an optical element that functions to reconstruct such a wave front. Therefore, it is necessary to record information for accurately reconstructing the amplitude and phase of the object light at each position in space on the recording medium of the hologram. If interference fringes generated by the object light and the reference light are recorded on the photosensitive medium, information that includes both the phase and the amplitude of the object light can be recorded, and, by projecting illumination reconstructing light equivalent to the reference light onto the medium, a part of the illumination reconstructing light can be observed as light provided with a wave front equivalent to the object light.

If the hologram is produced by an optical method using a laser beam or the like in this way, the phase and amplitude of the object light can be recorded only as interference fringes resulting from interference between the object light and the reference light. The reason is that the photosensitive medium has a property of being photosensitized in accordance with light intensity. On the other hand, a technique of producing a hologram by computations with use of a computer has recently been put to practical use. This technique is called a "CGH" (Computer-Generated Hologram) method, in which the wave front of object light is calculated by use of a computer, and its phase and its amplitude are recorded on a physical medium according to a certain method so as to produce a hologram. The employment of this computational holography, of course, enables the recording of an image as interference fringes between object light and reference light, and, in addition, enables the recording of information for the phase and amplitude of the object light directly onto a recording surface without using the reference light.

For example, an optical element, comprising a set of a plurality of three-dimensional cells, is disclosed in U.S. Pat. No. 6,618,190. This optical element functions as a complex amplitude type spatial optical modulator, and by using this art, a hologram can be arranged by the set of three-dimensional cells and a three-dimensional image can be recorded. A specific amplitude and a specific phase are defined in each individual three-dimensional cell of the optical element disclosed in U.S. Pat. No. 6,618,190, and when a predetermined incident light is provided to an individual cell, emitted light, with which the amplitude and phase of the incident light have been changed in accordance with the specific amplitude and specific phase defined in the cell, is obtained. That is, each individual cell has unique optical characteristics and functions as an element (complex amplitude type spatial optical modulation element) in which a specific amplitude and a specific phase are recorded.

As specific examples of three-dimensional cells having the function of recording both amplitude and phase, the above-mentioned U.S. Pat. No. 6,618,190 discloses cells, each having a groove formed by hollowing a portion, of an area that is in accordance with a specific amplitude, by just a depth that is in accordance with a specific phase, and cells, each having a convex part formed by protruding a portion, of an area that is in accordance with a specific amplitude, by just a height that is in accordance with a specific phase. An optical element comprising a set of three-dimensional cells having such characteristic shapes can be manufactured by a manufacturing process using an electron beam drawing device, etc., and thus has the merit of being suited for mass production.

However, with the optical elements using three dimensional cells that are disclosed as embodiments in the above-mentioned U.S. Pat. No. 6,618,190, noise components become mixed in during reconstruction and clear reconstruction results thus cannot be obtained necessarily. This is because a part of the incident light that is provided as illumination light in the reconstruction process or a part of the reflected light of this incident light is observed as 0th-order diffraction light. In particular, when such an optical element that gives rise to such 0th-order diffraction light is used in combination with a lens, the 0th-order diffraction light becomes converged at the focal point position of the lens and cannot be neglected in terms of practical use.

SUMMARY OF THE INVENTION

It is therefore an object of the present invention to provide an optical element that can function as a complex amplitude type spatial optical modulator in which generation of 0th-order diffraction light is reduced as much as possible.

(1) The first feature of the present invention resides in an optical element comprising a set of a plurality of three-dimensional cells:

wherein an individual cell is made of a light transmitting material and has a specific amplitude and a specific phase defined therein;

a first region, comprising a portion with an area that is in accordance with the specific amplitude defined in the individual cell, and a second region, comprising a portion except the first region, are defined on an upper surface of the individual cell, the first region on the upper surface of the individual cell being formed by a bottom surface of a groove, having a depth that is in accordance with the specific phase defined in the individual cell, and a light blocking layer being formed on the second region on the upper surface of the individual cell; and the individual cell has a specific optical characteristic such that when predetermined incident light is provided from the upper surface or a lower surface of the cell, transmission emitted light, with which amplitude and phase of the incident light have been changed in accordance with the specific amplitude and the specific phase defined in the cell, is obtained from the lower surface or the upper surface of the cell.

(2) The second feature of the present invention resides in an optical element comprising a set of a plurality of three-dimensional cells:

wherein an individual cell has a specific amplitude and a specific phase defined therein;

a first region, comprising a portion with an area that is in accordance with the specific amplitude defined in the individual cell, and a second region, comprising a portion except the first region, are defined on an upper surface of the individual cell, the first region on the upper surface of the individual cell being formed by a bottom surface of a groove, having a depth that is in accordance with the specific phase defined in the individual cell, the bottom surface of the groove being a reflecting surface and a light absorbing layer being formed on the second region on the upper surface of the individual cell; and the individual cell has a specific optical characteristic such that when predetermined incident light is provided from the upper surface of the cell, reflection emitted light, with which amplitude and phase of the incident light have been changed in accordance with the specific amplitude and the specific phase defined in the cell, is obtained from the upper surface of the cell.

(3) The third feature of the present invention resides in an optical element comprising a set of a plurality of three-dimensional cells:

wherein an individual cell is made of a light transmitting material and has a specific amplitude and a specific phase defined therein;

a first region, comprising a portion with an area that is in accordance with the specific amplitude defined in the individual cell, and a second region, comprising a portion except the first region, are defined on an upper surface of the individual cell, the first region on the upper surface of the individual cell being formed by a bottom surface of a groove, having a depth that is in accordance with the specific phase defined in the individual cell, a light absorbing layer being formed on the second region on the upper surface of the individual cell, and a light reflecting layer being formed on a bottom surface of the individual cell; and the individual cell has a specific optical characteristic such that when predetermined incident light is provided from the upper surface of the cell, reflection emitted light, with which amplitude and phase of the incident light have been changed in accordance with the specific amplitude and the specific phase defined in the cell, is obtained from the upper surface of the cell.

(4) The fourth feature of the present invention resides in an optical element comprising a set of a plurality of three-dimensional cells:

wherein an individual cell is made of a light transmitting material and has a specific amplitude and a specific phase defined therein;

a first region, comprising a portion with an area that is in accordance with the specific amplitude defined in the individual cell, and a second region, comprising a portion except the first region, are defined on an upper surface of the individual cell, the first region on the upper surface of the individual cell being formed by a bottom surface of a groove, having a depth that is in accordance with the specific phase defined in the individual cell, a light absorbing layer being formed on the second region on the upper surface of the individual cell, and a light reflecting layer being formed on the first region on the upper surface of the individual cell; and the individual cell has a specific optical characteristic such that when predetermined incident light is provided from a lower surface of the cell, reflection emitted light, with which amplitude and phase of the incident light have been changed in accordance with the specific amplitude and the specific phase defined in the cell, is obtained from the lower surface of the cell.

(5) The fifth feature of the present invention resides in an optical element comprising a set of a plurality of three-dimensional cells:

wherein an individual cell is made of a light transmitting material and has a specific amplitude and a specific phase defined therein;

a first region, comprising a portion with an area that is in accordance with the specific amplitude defined in the individual cell, and a second region, comprising a portion except the first region, are defined on an upper surface of the individual cell, the first region on the upper surface of the individual cell being formed by a convex part, having a height that is in accordance with the specific phase defined in the individual cell, and a light blocking layer being formed on the second region on the upper surface of the individual cell; and the individual cell has a specific optical characteristic such that when predetermined incident light is provided from the upper surface or a lower surface of the cell, transmission emitted light, with which amplitude and phase of the incident light have been changed in accordance with the specific amplitude and the specific phase defined in the cell, is obtained from the lower surface or the upper surface of the cell.

(6) The sixth feature of the present invention resides in an optical element comprising a set of a plurality of three-dimensional cells:

wherein an individual cell has a specific amplitude and a specific phase defined therein;

a first region, comprising a portion with an area that is in accordance with the specific amplitude defined in the individual cell, and a second region, comprising a portion except the first region, are defined on an upper surface of the individual cell, the first region on the upper surface of the individual cell being formed by a convex part, having a height that is in accordance with the specific phase defined in the individual cell, a top surface of the convex part being a reflecting surface and a light absorbing layer being formed on the second region on the upper surface of the individual cell; and the individual cell has a specific optical characteristic such that when predetermined incident light is provided from the upper surface of the cell, reflection emitted light, with which amplitude and phase of the incident light have been changed in accordance with the specific amplitude and the specific phase defined in the cell, is obtained from the upper surface of the cell.

(7) The seventh feature of the present invention resides in an optical element comprising a set of a plurality of three-dimensional cells:

wherein an individual cell is made of a light transmitting material and has a specific amplitude and a specific phase defined therein;

a first region, comprising a portion with an area that is in accordance with the specific amplitude defined in the individual cell, and a second region, comprising a portion except the first region, are defined on an upper surface of the individual cell, the first region on the upper surface of the individual cell being formed by a convex part, having a height that is in accordance with the specific phase defined in the individual cell, a light absorbing layer being formed on the second region on the upper surface of the individual cell, and a light reflecting layer being formed on a bottom surface of the individual cell; and the individual cell has a specific optical characteristic such that when predetermined incident light is provided from the upper surface of the cell, reflection emitted light, with which amplitude and phase of the incident light have been changed in accordance with the specific amplitude and the specific phase defined in the cell, is obtained from the upper surface of the cell.

(8) The eighth feature of the present invention resides in an optical element comprising a set of a plurality of three-dimensional cells:

wherein an individual cell is made of a light transmitting material and has a specific amplitude and a specific phase defined therein;

a first region, comprising a portion with an area that is in accordance with the specific amplitude defined in the individual cell, and a second region, comprising a portion except the first region, are defined on an upper surface of the individual cell, the first region on the upper surface of the individual cell being formed by a convex part, having a height that is in accordance with the specific phase defined in the individual cell, a light absorbing layer being formed on the second region on the upper surface of the individual cell, and a light reflecting layer being formed on the first region on the upper surface of the individual cell; and the individual cell has a specific optical characteristic such that when predetermined incident light is provided from a lower surface of the cell, reflection emitted light, with which amplitude and phase of the incident light have been changed in accordance with the specific amplitude and the specific phase defined in the cell, is obtained from the lower surface of the cell.

(9) The ninth feature of the present invention resides in an optical element having any one of the first to the eighth features mentioned above, wherein:

an individual cell is arranged by forming, on a base having a first rectangular parallelepiped shape, a groove with a second rectangular parallelepiped shape that is smaller than the first rectangular parallelepiped shape.

(10) The tenth feature of the present invention resides in an optical element having the ninth feature mentioned above, wherein:

individual cells are aligned in a form of a two-dimensional matrix with respective upper surfaces being directed upward.

(11) The eleventh feature of the present invention resides in an optical element having any one of the first to the tenth features mentioned above, wherein:

a complex amplitude distribution of object light from an object image is recorded so that the object image is reconstructed upon observation from a predetermined viewing point position thus to use the optical element as a hologram.

According to an optical element of the present invention, as forming a light blocking layer or a light absorbing layer on a part, which has nothing to do with generation of reconstructing light, of respective three-dimensional cells functioning as a complex amplitude type spatial optical modulator, generation of 0th-order diffraction light can be reduced.

BRIEF DESCRIPTION OF THE DRAWINGS

FIG. 13 shows the relationship between the refractive index and the groove depth of each part for the reflection type cell $C(x, y)$.

DESCRIPTION OF THE PREFERRED EMBODIMENTS

The present invention will be hereinafter described on the basis of the embodiments shown in the figures. Incidentally, the present invention is an improved version of the former invention described in the above-mentioned U.S. Pat. No. 6,618,190 (hereinafter, this former invention is referred to as the basic invention). Therefore, first, the basic invention is described in § 1 to § 5 and then improved parts of the present invention are described in § 6 and § 7.

<<<§ 1. Basic Principle of the Basic Invention>>>

Figure 1:
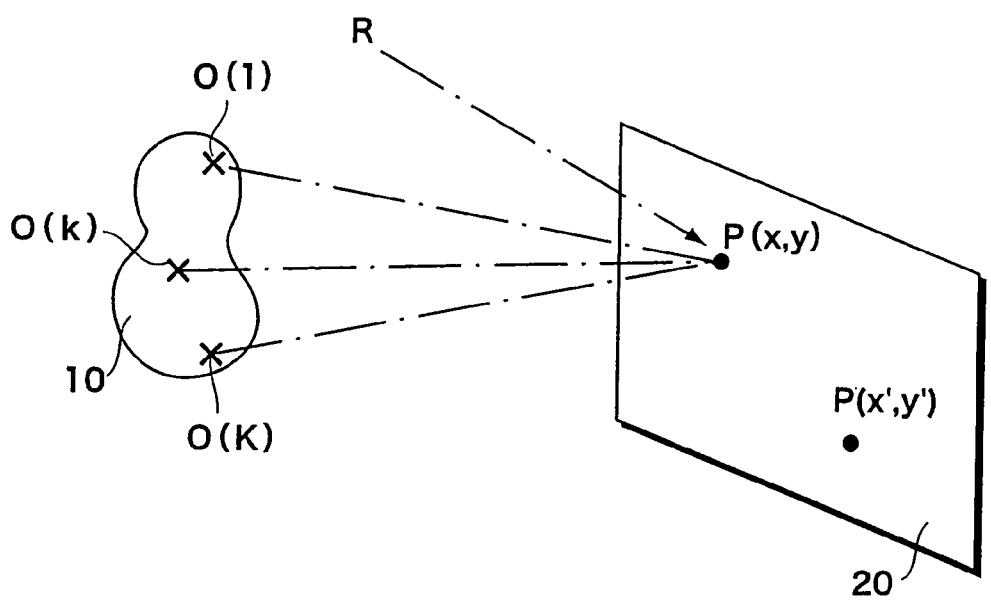
FIG. 1 is a perspective view showing general holography for optically recording an object image as interference fringes by use of reference light.

FIG. 1 is a perspective view that shows general holography in which an object image is optically recorded as interference fringes by use of reference light. When a stereoscopic image of an object 10 is recorded onto a recording medium 20, the object 10 is illuminated with light (normally, with a laser beam) having the same wavelength as reference light R, and interference fringes formed by object light from the object 10 and the reference light R on the recording medium 20 are recorded. Herein, if an XY coordinate system is defined on the recording medium 20, and attention is paid to an arbitrary point P(x, y) located at coordinates (x, y), the amplitude intensity of a composite wave resulting from interference between each object light from each point O(1), O(2), . . . , O(k), . . . , O(K) located on the object 10 and the reference light R will be recorded onto the point P(x, y). Likewise, the amplitude intensity of the composite wave resulting from the interference between the object light from each point and the reference light R will be recorded onto another point P(x',y') on the recording medium 20. However, since a difference in the propagation distance of light exists, the amplitude intensity recorded onto the point P(x, y) and the amplitude intensity recorded onto the point P(x',y') are different from each other. As a result, an amplitude intensity distribution is recorded onto the recording medium 20, and the amplitude and phase of the object light are expressed by this amplitude intensity distribution. When reconstructed, reconstructing illumination light having the same wavelength as the reference light R is projected from the same direction as that of the reference light R (or, alternatively, from a direction that has a plane symmetry with respect to the recording medium 20), and thus a stereoscopic reconstructed image of the object 10 is obtained.

In order to record interference fringes onto the recording medium 20 according to an optical method, a photosensitive material is used as the recording medium 20, and interference fringes are recorded as a light and dark pattern on the recording medium 20. On the other hand, if the computer-generated hologram method is used, a phenomenon occurring in the optical system shown in FIG. 1 requires simulation on a computer. Specifically, the object image 10 and the recording surface 20 are defined in a virtual three-dimensional space on the computer instead of the real object 10 or the real recording medium 20, and many point light sources O(1), O(2), . . . , O(k), . . . , O(K) are defined on the object image 10. Further, object light (i.e., spherical wave) with a predetermined wavelength, amplitude, and phase is defined for each point light source, and reference light with the same wavelength as the object light is defined. On the other hand, many representative points P(x, y) are defined on the recording surface 20, and the amplitude intensity of a composite wave of both the object light and the reference light that reach the position of each representative point is calculated. Since an amplitude intensity distribution (i.e., interference fringes) is obtained on the recording surface 20 by computation, a physical hologram recording medium can be formed if the amplitude intensity distribution is recorded onto the physical recording medium in the form of a light/dark distribution or as a concave/convex distribution.

In fact, the interference fringes are not necessarily required to be recorded by using the reference light R if the computer-generated hologram method is used. It is also possible to record the object light from the object image 10 directly onto the recording surface 20. In more detail, when a hologram is optically generated, it is necessary to generate an interference wave on the recording medium 20 made of a photosensitive material during a fixed period of time needed for exposure and to record this wave as interference fringes. Therefore, it is necessary to generate an interference wave that turns to a standing wave by use of reference light. However, if the computer-generated hologram method is used, the state of the wave at a certain moment that exists on the recording surface 20 can be observed in such a way as if a lapse in time is stopped, and this wave can be recorded. In other words, the amplitude and phase of the object light at the position of each representative point on the recording surface 20 at a predetermined standard time can be obtained by calculation. In the embodiment of the basic invention described in the above-mentioned U.S. Pat. No. 6,618,190, this advantage in a computer-generated hologram is employed, and the method for directly recording the amplitude and phase of the object light is used without using the method for recording the object light as interference fringes resulting from cooperation with the reference light.

Figure 2:
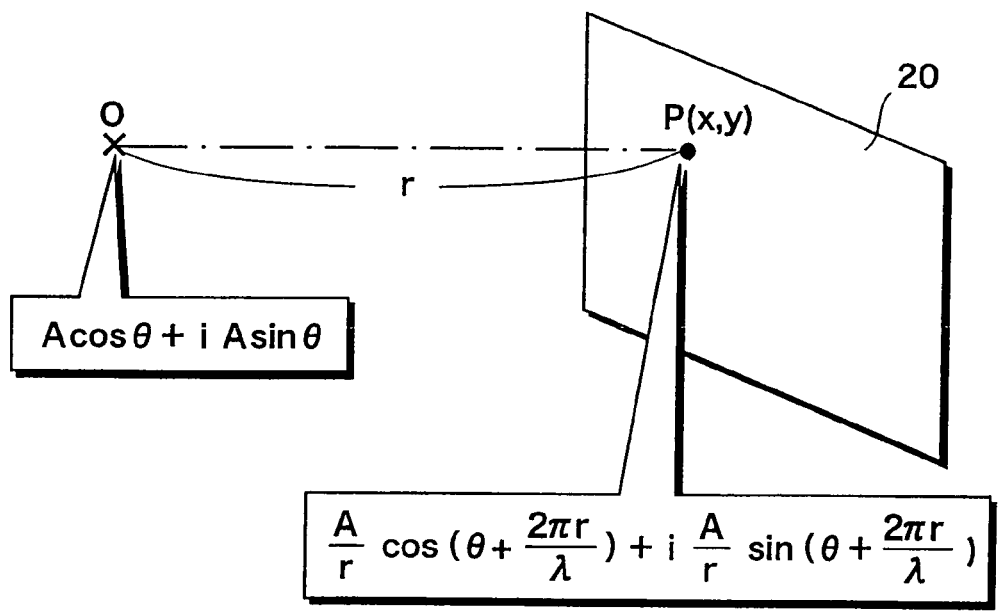
FIG. 2 is a perspective view showing the amplitude and phase of object light that has reached a representative point $P(x, y)$ on a recording surface 20 when a point light source O and the recording surface 20 are defined.

Now let us consider how the amplitude and phase of the object light that has reached the representative point P(x, y) on the recording surface 20 are calculated when the point light source O and the recording surface 20 are defined as shown in, for example, the perspective view of FIG. 2. Generally, a wave motion in consideration of the amplitude and the phase is expressed by the following function of complex variable (i is an imaginary unit):

$$A \cos \theta + iA \sin \theta$$

Herein, A is a parameter showing the amplitude, and θ is a parameter showing the phase. Accordingly, if object light emitted from a point light source O is defined by the function A cos θ+i A sin θ, the object light at the position of a representative point P(x, y) is expressed by the following function of the complex variable:

$$A/r \cos(\theta+2\pi r/\lambda)+iA/r \sin(\theta+2\pi r/\lambda)$$

Herein, r is a distance between the point light source O and the representative point P(x, y), and λ is a wavelength of the object light. The amplitude of the object light attenuates as the distance r becomes greater, and the phase depends on the distance r and the wavelength λ. This function does not have variables that indicate time. The reason is that this function is an expression showing the momentary state of a wave observed when a lapse in time is stopped at a predetermined standard time as described above.

Figure 3:
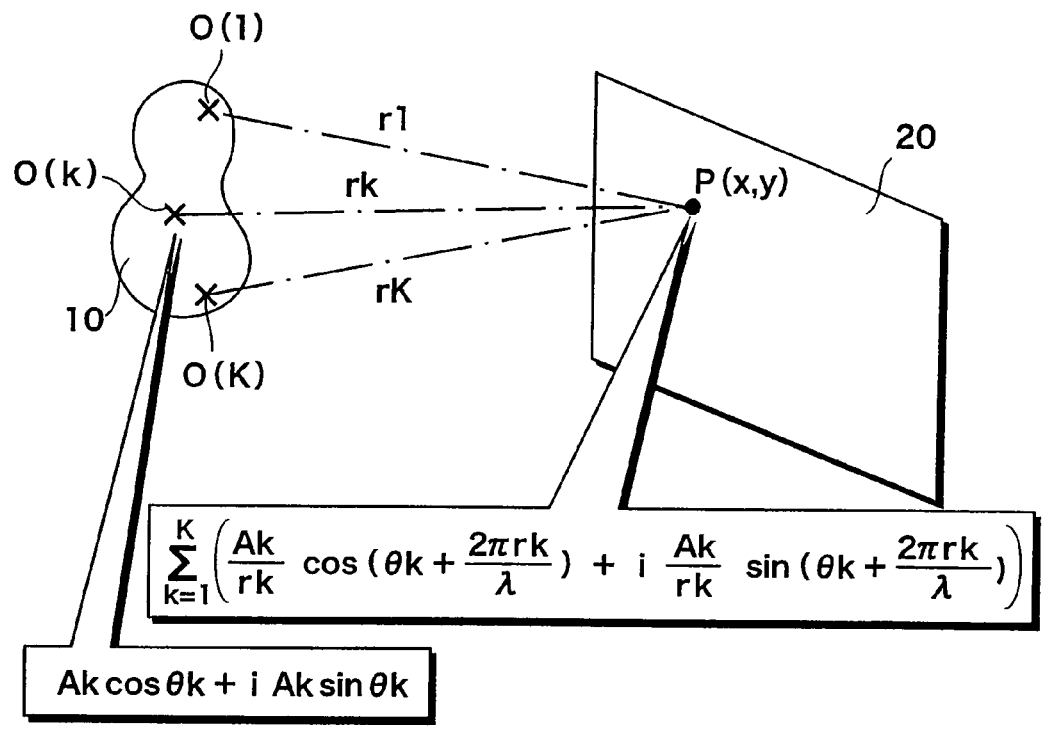
FIG. 3 is a perspective view showing the complex amplitude of object light at the position of the representative point $P(x, y)$ when the object light emitted from each point light source on an object image 10 has reached the representative point $P(x, y)$ on the recording surface 20.

Accordingly, in order to record information for the object image 10 onto the recording surface 20, many point light sources O(1), O(2), ..., O(k), ..., O(K) are defined on the object image 10 as shown in the perspective view of FIG. 3, and then the amplitude and phase of a composite wave of the object light emitted from each point light source are calculated at the position of each representative point on the recording surface 20, and the calculation result is recorded by a certain method. Let us now suppose that K point light sources in total are defined on the object image 10, and the object light emitted from the k-th ("-th" is a suffix indicating an ordinal number) point light source O(k) is expressed by the following function of the complex variable as shown in FIG. 3:

$$Ak \cos \theta k + iAk \sin \theta k$$

If the object image 10 is constructed of a set of pixels each of which has a predetermined gradation value (concentration value), the parameter Ak showing the amplitude is fixed in accordance with the gradation value of a pixel which exists at the position of the point light source O(k). The phase θk is allowed to be defined generally as θk=0. However, it is also possible to create such a setting as to emit object light rays different in phase from each part of the object image 10 if necessary. When the object light expressed by the above function can be defined for each of all the K point light sources, the composite wave of all the K object light at the position of an arbitrary representative point P(x, y) on the recording surface 20 is expressed by the following function of the complex variable as shown in FIG. 3:

$$\sum_{k=1,K} (Ak/rk\cos(\theta k + 2\pi rk/\lambda) + iAk/rk\sin(\theta k + 2\pi rk/\lambda))$$

Herein, rk is the distance between the k-th point light source O(k) and the representative point P(x, y). The above function corresponds to an expression that is used when the object image 10 is reconstructed at the back of the recording medium. When the object image 10 is reconstructed to rise to the front side of the recording medium, the function of the complex variable is merely calculated according to the following expression (note that the reference character in the term of the phase is negative):

$$\sum_{k=1,K} (Ak/rk\cos(\theta k - 2\pi rk/\lambda) + iAk/rk\sin(\theta k - 2\pi rk/\lambda))$$

Therefore, the function of the complex variable in consideration of both situations is as follows:

$$\sum_{k=1,K} (Ak/rk\cos(\theta k \pm 2\pi rk/\lambda) + iAk/rk\sin(\theta k \pm 2\pi rk/\lambda))$$

Figure 4:
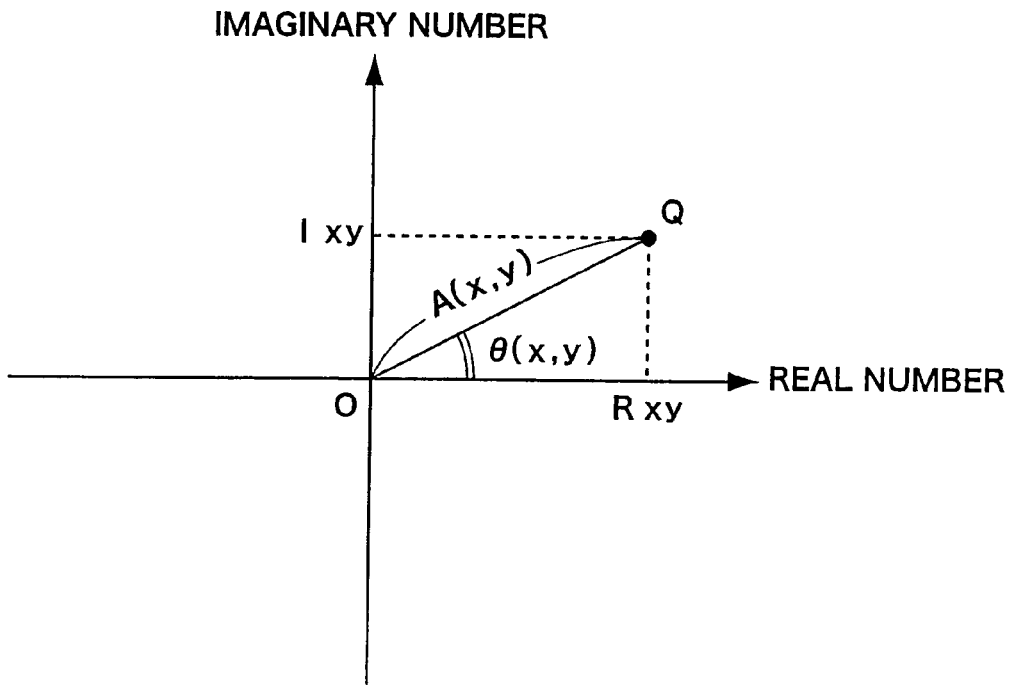
FIG. 4 shows the calculation of an amplitude $A(x, y)$ and a phase $\theta(x, y)$ on the basis of a complex amplitude shown by a coordinate point Q on a complex coordinate plane.

If the form of Rxy+iIxy is taken under the condition that the real number part of this function is Rxy and the imaginary number part thereof is Ixy, the complex amplitude (i.e., amplitude in consideration of the phase) at the position of the representative point P(x, y) of this composite wave is shown by a coordinate point Q on the complex coordinate plane as shown in FIG. 4. After all, the amplitude of the composite wave of the object light at the representative point P(x, y) is given by the distance A(x, y) between the origin O and the coordinate point Q on the coordinate plane shown in FIG. 4, and the phase is given by the angle θ(x, y) between the vector OQ and the real number axis.

Thus, the amplitude A(x, y) and phase θ(x, y) of the composite wave of the object light at the position of the arbitrary representative point P(x, y) defined on the recording surface 20 is obtained by computation. Accordingly, the complex amplitude distribution (i.e., distribution of the amplitude and phase of the object-light-composite wave) of the object light emitted from the object image 10 is obtained on the recording surface 20. As a result, the object image 10 can be recorded as a hologram if the complex-amplitude distribution obtained in this way is recorded on a physical recording medium in some way so that the wave front of the object light is to be reconstructed and then predetermined reconstructing illumination light is given.

Figure 5:
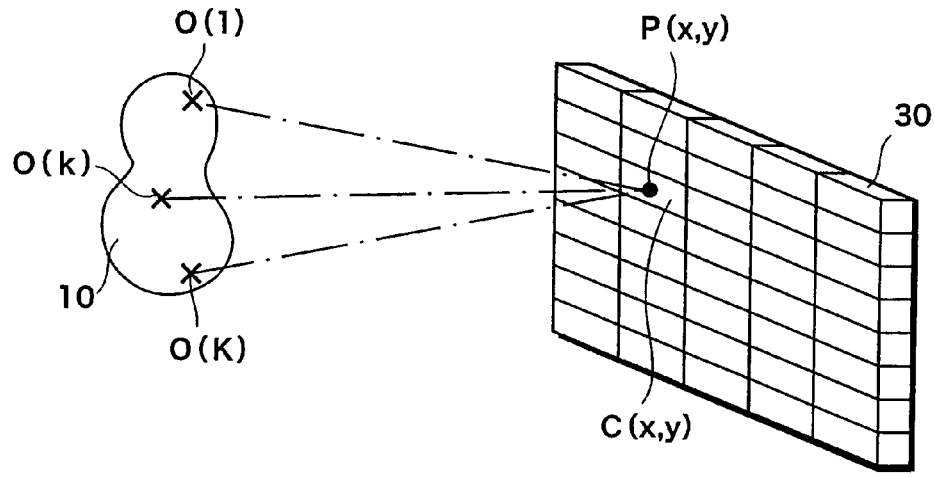
FIG. 5 is a perspective view showing one example of a three-dimensional virtual cell set 30 defined to record the object image 10.

In order to record a complex amplitude distribution of object light emitted from the object image 10 onto the recording surface 20, the basic invention adopts a method for using three-dimensional cells. The following procedure should be carried out to record a complex amplitude distribution by use of three-dimensional cells and record the object image 10 as a hologram. First, a three-dimensional virtual cell set 30 is defined at the position of the recording surface 20 as shown in FIG. 5, for example. The three-dimensional virtual cell set 30 is constructed by vertically and horizontally arranging block-like virtual cells each of which has a predetermined size so as to place the cells two-dimensionally. Thereafter, the representative point of each virtual cell is defined. The position of the representative point may be one arbitrary point in the cell. In this case, the representative point of the cell is defined at the position of the center point on the front surface of the cell (i.e., surface facing the object image 10). For example, if an XY coordinate system is defined on the front surface of the three-dimensional virtual cell set 30 (i.e., on the surface facing the object image 10), and a virtual cell having the representative point P(x, y) located at the position of coordinates (x, y) in this coordinate system is called a virtual cell C(x, y), the representative point P(x, y) will occupy the center point of the front surface of this virtual cell C(x, y).

On the other hand, the object image 10 is defined as a set of point light sources. In the example of FIG. 5, the object image 10 is defined as a set of K point light sources O(1), O(2), . . . , O(k), . . . , O(K). Object light having predetermined amplitude and phase is emitted from each point light source, and a composite wave of these object light rays reaches the representative point P(x, y). The complex amplitude of this composite wave can be calculated according to the above-mentioned expressions and can be shown as a coordinate point Q on the complex coordinate plane shown in FIG. 4, and, based on this coordinate point Q, the amplitude A(x, y) and phase θ(x, y) are obtained, as described above. Herein, the amplitude A(x, y) and phase θ(x, y) obtained for the representative point P(x, y) will be called a specific amplitude A(x, y) and a specific phase θ(x, y) for the virtual cell C(x, y) including the representative point P(x, y).

The above-mentioned procedure is practically carried out as arithmetic processing by use of a computer. Accordingly, concerning each of all the virtual cells that make up the three-dimensional virtual cell set 30, a specific amplitude and a specific phase can be obtained by this arithmetic processing. Therefore, an optical element (i.e., a hologram recording medium in which the object image 10 is recorded) that is made up of a set of three-dimensional physical cells can be formed by replacing these virtual cells with real physical cells, respectively. Herein, the physical cell to be replaced with the virtual cell must have optical properties by which the amplitude and phase of incidence light can be modulated in accordance with the specific amplitude and specific phase defined in the virtual cell. In other words, when predetermined incidence light is given, the replaced individual physical cell must have the specific optical properties of having a function to generate emission light by changing the amplitude and phase of the incidence light in accordance with the specific amplitude and specific phase that have been defined in the virtual cell before replacement.

When predetermined reconstructing illumination light (ideally, a plane wave of monochromatic light with the same wavelength as the wavelength λ of the object light used in the above-mentioned arithmetic processing) is projected onto the optical element made up of a set of physical cells having the specific optical properties, the reconstructing illumination light is modulated by the specific amplitude and the specific phase in each physical cell. Therefore, the original wave front of the object light is reconstructed. As a result, the hologram recorded in this optical element is reconstructed.

<<<§ 2. Concrete Structure of Physical Cell>>>

Figure 6:
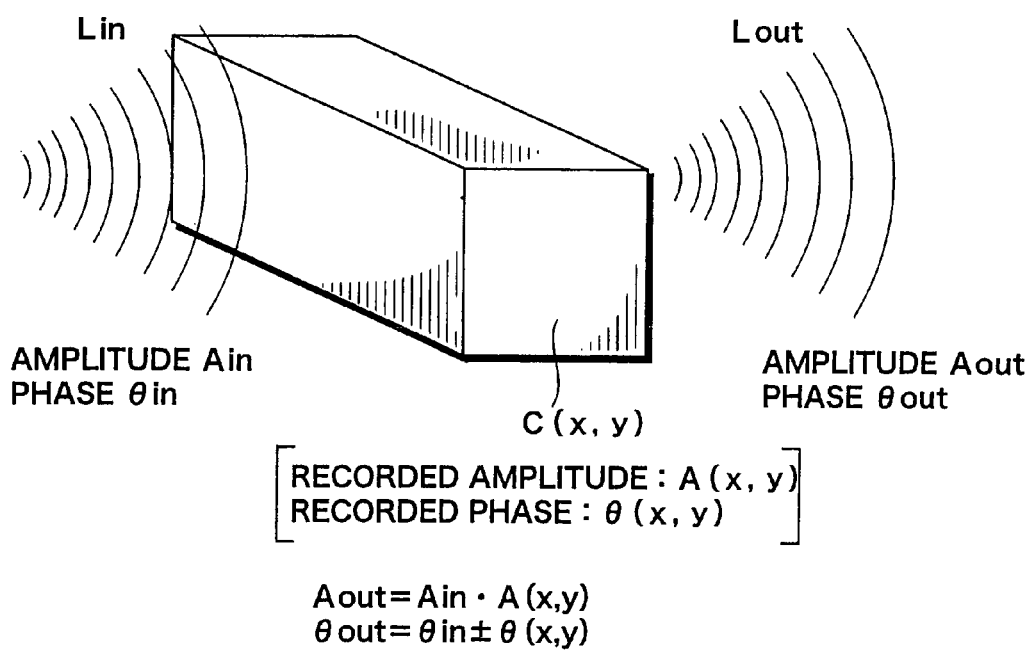
FIG. 6 shows the function of the amplitude modulation and phase modulation of a three-dimensional cell $C(x, y)$ used in the present invention.

Next, the concrete structure of a physical cell used in the basic invention will be described. A physical cell used in the basic invention theoretically is a three-dimensional stereocell, and its specific amplitude and its specific phase are defined. Any type of cell can be used if it has such a specific optical property that emission light in which the amplitude and phase of predetermined incidence light are changed in accordance with the specific amplitude and specific phase defined in the cell can be obtained when the incidence light is given to the cell. For example, in a case in which an amplitude A(x, y) and a phase θ(x, y) is recorded for a three-dimensional cell C(x, y) shown in FIG. 6, and incidence light Lin whose amplitude is Ain and whose phase is θin is given to this cell, all that is needed is to obtain emission light Lout whose amplitude Aout equals Ain·A(x, y) and whose phase θout equals θin±θ(x, y). The amplitude Ain of the incidence light undergoes modulation by the specific amplitude A(x, y) recorded on the cell and changes into the amplitude Aout, whereas the phase θin of the incidence light undergoes modulation by the specific phase θ(x, y) recorded on the cell and changes into the phase θout.

One method for modulating the amplitude in the three-dimensional cell is to provide an amplitude-modulating part having transmittance that corresponds to the specific amplitude in the cell (the entire cell may be used as the amplitude-modulating part, or the amplitude-modulating part may be provided to a part of the cell). For example, a cell provided with the amplitude-modulating part whose transmittance is Z % serves as a cell in which the specific amplitude of A(x, y) equal to Z/100 is recorded, and, when incidence light with the amplitude Ain passes through this cell, it is subjected to amplitude modulation by emission light whose amplitude Aout equals Ain·Z/100. One possible method for setting the transmittance of each three-dimensional cell at an arbitrary value is to, for example, change the content of a coloring agent for each cell.

Another method for modulating the amplitude in the three-dimensional cell is to provide an amplitude-modulating part having reflectivity that corresponds to the specific amplitude in the cell. For example, a cell provided with the amplitude-modulating part whose reflectivity is Z % serves as a cell in which the specific amplitude of A(x, y) equal to Z/100 is recorded, and, when incidence light with the amplitude Ain is reflected by this amplitude-modulating part and is emitted, it is subjected to amplitude modulation by emission light whose amplitude Aout equals Ain·Z/100. One possible method for setting the reflectivity of each three-dimensional cell at an arbitrary value is to, for example, prepare a reflecting surface in the cell (this reflecting surface serves as the amplitude-modulating part) and set the reflectivity of the reflecting surface at an arbitrary value. More specifically, the ratio of reflected light to scattered light can be adjusted by, for example, changing the surface roughness of the reflecting surface, and therefore the adjustment of the surface roughness makes it possible to prepare a cell having arbitrary reflectivity.

Still another method for modulating the amplitude in the three-dimensional cell is to provide an amplitude-modulating part having an effective area that corresponds to the specific amplitude in the cell. For example, if it is assumed that the area of all the incident region of incidence light is 100%, a cell having an amplitude-modulating part constructed such that emission light effective for reconstructing an object image can be obtained only from incidence light that has struck a part having a Z % effective area thereof serves as a cell in which the specific amplitude of A(x, y)=Z/100 is recorded. That is, even if incidence light having the amplitude Ain strikes the amplitude-modulating part, only Z % of the light goes out as effective emission light, and therefore it is subjected to amplitude modulation by emission light having the amplitude of Aout=Ain·Z/100. One possible method for obtaining effective emission light only from a region having such a specific effective area is to use a cell having a physical concave/convex structure. The present invention relates to an optical element using a three-dimensional cells having such a structure and a concrete example thereof will be described in § 3.

On the other hand, one method for modulating the phase in the three-dimensional cell is to provide a phase-modulating part having a refractive index that corresponds to the specific phase in the cell (the entire cell can be used as the phase-modulating part, or the phase-modulating part can be provided to a part of the cell). For example, even if incidence light with the same phase is given, a difference in the phase of emission light arises between a cell provided with the phase-modulating part made of a material whose refractive index is nil and a cell provided with the phase-modulating part made of a material whose refractive index is n2. Therefore, arbitrary phase modulation can be applied to the incidence light by constructing the cell made of various materials with different refractive indexes.

Another method for modulating the phase in the three-dimensional cell is to provide a phase-modulating part having an optical path length that corresponds to the specific phase in the cell (the entire cell can be used as the phase-modulating part, or the phase-modulating part can be provided to a part of the cell). For example, even if the cell has a phase-modulating part made of the same material whose refractive index is n, a difference in the phase of each emission light will arise if the optical path length of the phase-modulating part is different regardless of the fact that incidence light with the same phase is given. For example, if the optical path length of the phase-modulating part provided in a first cell is L, and the optical path length of the phase-modulating part provided in a second cell is 2L, the distance by which emission light emitted from the second cell travels through the material whose refractive index is n is twice as long as in the case of emission light emitted from the first cell even if incidence light with the same phase is given. Therefore, such a great phase difference arises. A method for realizing a phase-modulating part with an arbitrary optical path length is to still use a cell having a physical concave/convex structure. A concrete example thereof will be described in § 3.

A three-dimensional cell having an amplitude modulating function based on a specific amplitude or a three-dimensional cell having a phase modulating function based on a specific phase can be realized by some of the methods described above, and an optical element according to the present invention can be realized by selecting an arbitrary method from among the amplitude modulating methods and the phase modulating methods mentioned above. For example, if a method in which an amplitude-modulating part with transmittance that corresponds to a specific amplitude is provided in the cell is employed as the amplitude modulating method, and a method in which a phase-modulating part with a refractive index that corresponds to a specific phase is provided in the cell is employed as the phase modulating method, and the entire cell is used as the amplitude-modulating part and as the phase-modulating part, an optical element can be formed by selectively arranging 16 kinds of physical cells shown in the table of FIG. 7. The horizontal axis of this table indicates amplitude A, and the vertical axis thereof indicates phase θ. The amplitude A and the phase θ are each divided into four ranges.

Herein, the cells (i.e., cells of the first column in the table) depicted in a range in which the amplitude A corresponds to "0-25%" are ones that are each made of a material whose transmittance is very low, the cells (i.e., cells of the second column in the table) depicted in a range in which the amplitude A corresponds to "25-50%" are ones that are each made of a material whose transmittance is slightly low, the cells (i.e., cells of the third column in the table) depicted in a range in which the amplitude A corresponds to "50-75%" are ones that are each made of a material whose transmittance is slightly high, and the cells (i.e., cells of the fourth column in the table) depicted in a range in which the amplitude A corresponds to "75-100%" are ones that are each made of a material whose transmittance is very high. On the other hand, the cells (i.e., cells of the first row in the table) depicted in a range in which the phase θ corresponds to "3π/2—2π" ones that are each made of a material whose refractive index n4 is very much greater than that of air.

Figure 7:
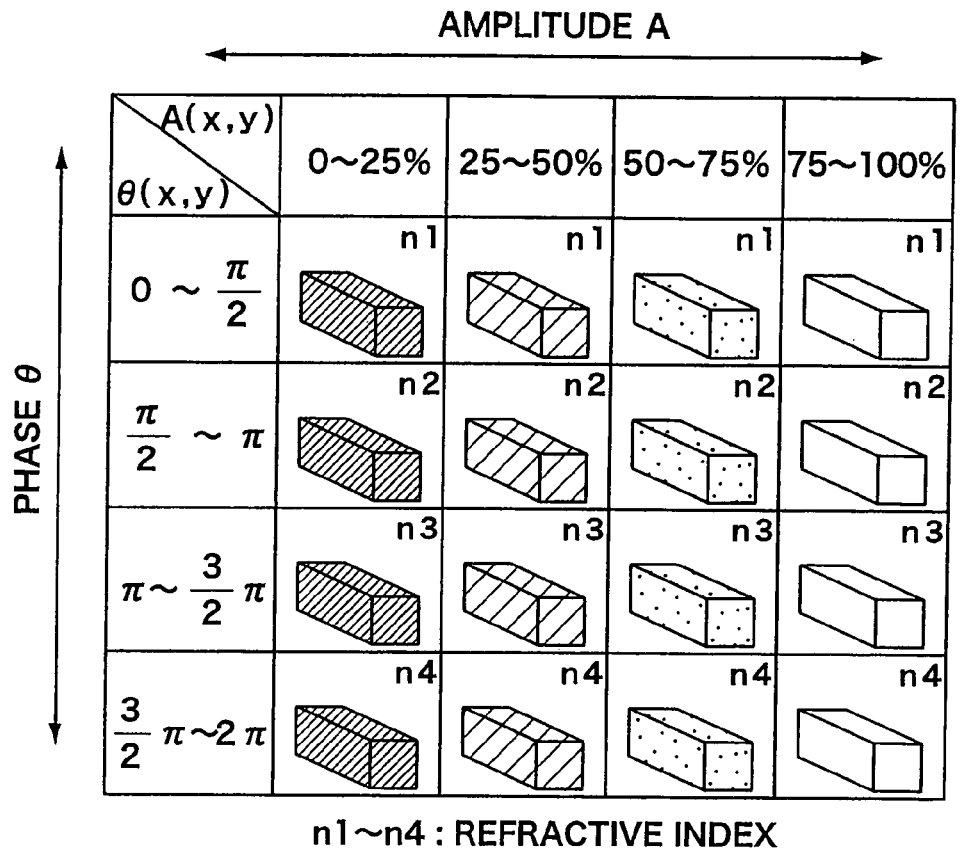
FIG. 7 shows one example of 16 kinds of physical cells different in transmittance and in refractive index that are to be the constituent parts of an optical element according to the present invention.

In the example of FIG. 7, sixteen cells in total with four kinds of transmittances and four kinds of refractive indexes are prepared as described above. A desirable way of recording the amplitude and phase in the cell with higher accuracy is to set the transmittance steps and the refractive-index steps in more detail and prepare even more kinds of cells. What is needed to replace the virtual cells by use of these sixteen kinds of physical cells is to select a physical cell that has optical properties closest in the optical properties needed to carry out modulation based on the specific amplitude and the specific phase defined in each virtual cell.

<<<§ 3. Practical Structure of Physical Cell>>>

If physical cells used in the basic invention are cells that have a function to modulate incidence light in accordance with a specific amplitude and a specific phase as described above, any kind of cell structure is allowed in principle to embody the basic invention. FIG. 7 shows an example in which the modulation according to a specific amplitude is controlled by the transmittance, and the modulation according to a specific phase is controlled by the refractive index. Theoretically, many methods exist to modulate the amplitude or the phase as described above. However, from the viewpoint of industrial mass production, all the methods are not necessarily practical. In order to reconstruct an object image that has a certain degree of resolution by using the optical element based on the principle of the basic invention, the size of each three-dimensional cell must be determined to be less than a criterion (roughly speaking, when the size of a cell exceeds 100 μm, it is difficult to reconstruct a satisfactorily discernible object image). Therefore, it is need to two-dimensionally arrange small cells as a component if sixteen kinds of physical cells shown in FIG. 7 are combined to form an optical element, and, additionally, there is a need to dispose a specific cell of the sixteen kinds of cells at a specific position. From this fact, it can be found that the method for constructing the optical element using the physical cells shown in FIG. 7 is unsuitable for industrial mass production.

As a method in which amplitude information and phase information can be given to a single physical cell and an optical element suitable for industrial mass production is constructed with a set of such physical cells, a unique method is proposed in the above-mentioned U.S. Pat. No. 6,618,190 for giving a concave/convex structure to each physical cell, then recording amplitude information as the area of this concave/convex structure part, and recording phase information as a level difference (i.e., depth of a concave part or height of a convex part) in the concave/convex structure part.

Figure 8:
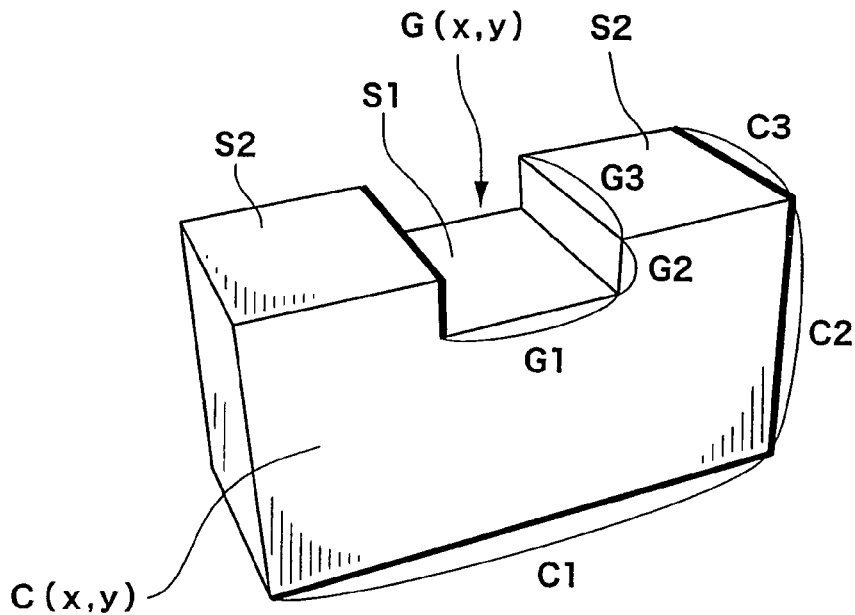
FIG. 8 is a perspective view showing one example of the structure of a physical cell $C(x, y)$ considered most suitable for use in the present invention.

FIG. 8 is a perspective view showing an example of the structure of a physical cell C(x, y) that can be regarded as most suitable for use in the basic invention. As shown in the figure, this three-dimensional physical cell is constituted of a base having a rectangular solid block shape. On an upper surface of the base, a groove G(x, y) is formed which has another rectangular solid block shape smaller than the former solid block. As mentioned later, it is possible to constitute a physical cell having a same function by providing a convex part B(x, y) having a rectangular solid block shape instead of providing a groove G(x, y).

In this example, the size of the physical cell C(x, y), C1=0.6 μm, C2=0.25 μm, and C3=0.25 μm, and the size of the groove G(x; y), G1=0.2 μm, G2=0.05 μm, and G3=C3=0.25 μm are shown in the figure. The use of the thus constructed physical cell C(x, y) makes it possible to record the amplitude information as a value of the lateral width G1 of the groove G(x, y) and record the phase information as a value of the depth G2 of the groove G(x, y). In other words, when a virtual cell in which a specific amplitude and a specific phase are defined is replaced with the thus constructed physical cell, the replacement is carried out by the physical cell having the size G1 corresponding to the specific amplitude and having the size G2 corresponding to the specific phase.

Figure 9:
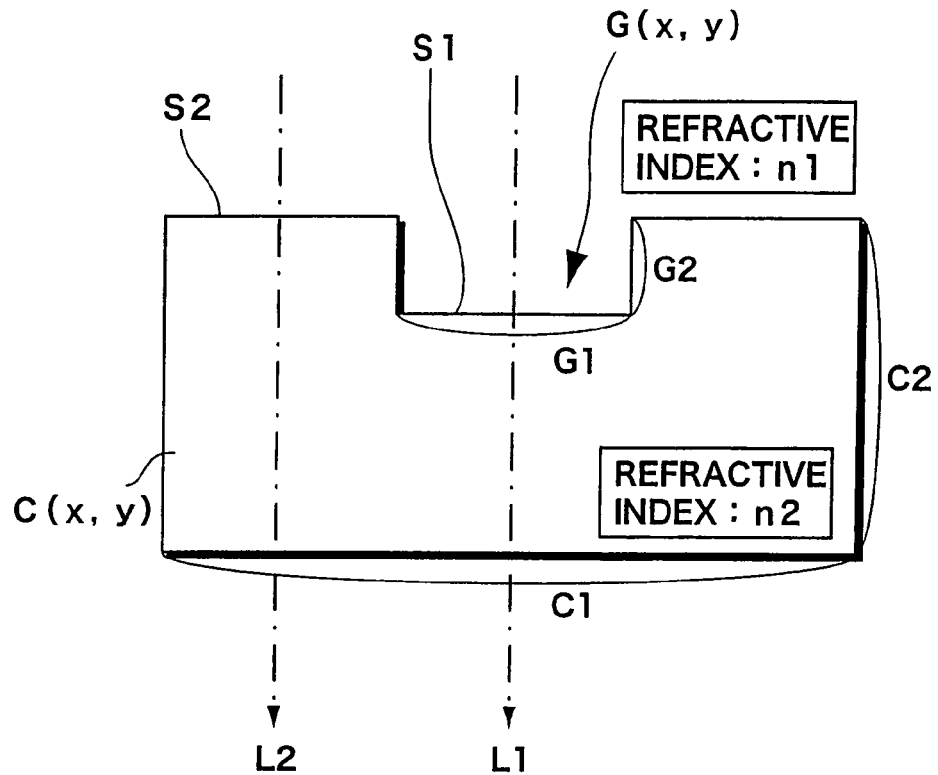
FIG. 9 is a front view for explaining a reason why amplitude information is recorded as a width G1 of a groove $G(x, y)$ and phase information is recorded as a depth G2 of the groove $G(x, y)$ when the physical cell $C(x, y)$ shown in FIG. 8 is used as a transmission type cell.

With reference to the front view of FIG. 9, a description will be provided of the reason why the amplitude information is recorded as the width G1 of the groove G(x, y) and the phase information is recorded as the depth G2 of the groove G(x, y) in the physical cell shown in FIG. 8. Let us now suppose that the physical cell C(x, y) is made of a material with the refractive index n2, and the part outside the physical cell C(x, y) is made of a material (e.g., air) with the refractive index n1. In this case, when the optical path length passing through the medium with the refractive index n2 is compared between incident light L1 that has struck vertically the inner surface S1 of the groove G(x, y) and incident light L2 that has struck vertically the outer surface S2 of the groove G(x, y), it can be found that the optical path length of the light L1 is shorter than that of the light L2 by the depth G2 of the groove G(x, y). Therefore, if the refractive indexes n1 and n2 are different from each other, a predetermined phase difference will arise between the light L1 and the light L2 emitted from the physical cell C(x, y) as transmission light.

Figure 10:
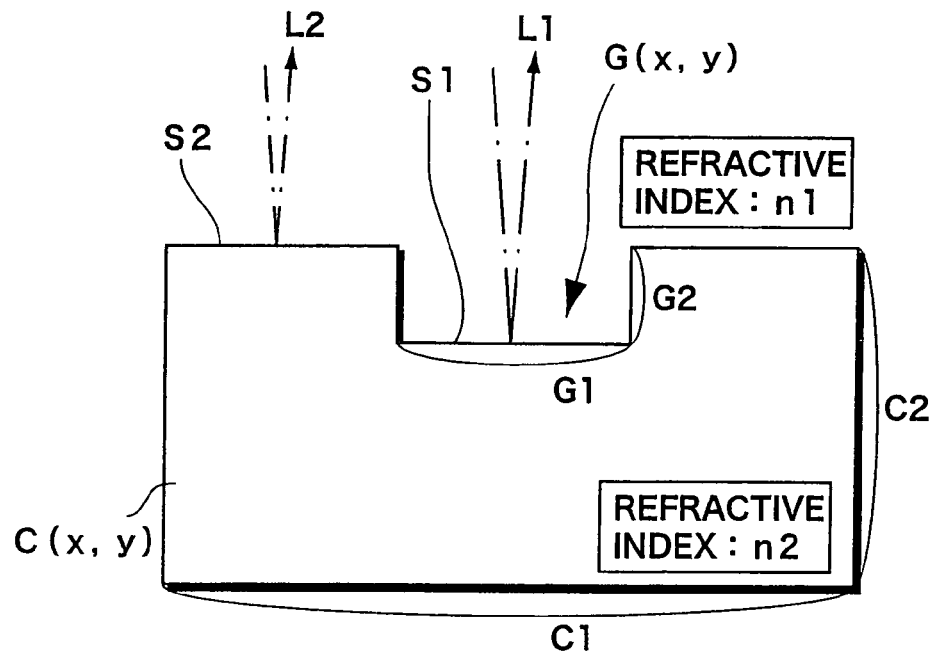
FIG. 10 is a front view for explaining a reason why amplitude information is recorded as the width G1 of the groove $G(x, y)$ and phase information is recorded as the depth G2 of the groove $G(x, y)$ when the physical cell $C(x, y)$ shown in FIG. 8 is used as a reflection type cell.

On the other hand, FIG. 10 is a front view showing a case in which emission light is obtained as reflected light from the physical cell C(x, y). In this example, the upper surface of the physical cell C(x, y), i.e., surfaces S1 and S2 are reflecting-surfaces, and the incident light L1 that has struck almost vertically the inner surface S1 of the groove G(x, y) and the incident light L2 that has struck almost vertically the outer surface S2 of the groove G(x, y) are reflected by the respective surfaces almost vertically and emitted therefrom. At this time, it can be found that, when the entire optical path length along the path of the incidence and reflection is compared, the optical path length of the light L1 becomes longer than that of the light L2 by double the depth G2 of the groove G(x, y). Therefore, a predetermined phase difference arises between the light L1 and the light L2 emitted from the physical cell C(x, y) as reflected light.

Accordingly, even if the physical cell C(x, y) is a transmission type cell or a reflection type cell, a predetermined phase difference arises between the incident light L1 that has struck the inner surface S1 of the groove G(x, y) and the incident light L2 that has struck the outer surface S2 of the groove G(x, y). This phase difference depends on the depth G2 of the groove G(x, y). Therefore, if only the emission light obtained on the basis of the incidence light that has struck the inner surface S1 of the groove G(x, y) among the incident light rays that have struck the upper surface of the physical cell C(x, y) is treated as emission light effective for the reconstruction of the object image 10 (in other words, if only the light L1 is treated as emission light effective for the reconstruction of the image in FIG. 9 or FIG. 10), emission light L1 effective for the image reconstruction resultantly undergoes phase modulation by a specific phase that corresponds to the depth G2 of the groove G(x, y) in this physical cell C(x, y). Thus, the phase information of the object light can be recorded as the depth G2 of the groove G(x, y).

Further, if only the emission light obtained on the basis of the incidence light that has struck the inner surface S1 of the groove G(x, y) is treated as emission light effective for the reconstruction of the object image 10 as mentioned above, the amplitude information of the object light can be recorded as the width G1 of the groove G(x, y). The reason is that the area of the inner surface S1 of the groove G(x, y) enlarges, and the percentage of the emission light effective for the reconstruction of the object image 10 increases as the width G1 of the groove G(x, y) becomes greater. That is, since the emission light L2 shown in FIG. 9 or FIG. 10 does not include any significant phase components, the emission light is merely observed as a noise component of a so-called background, and is not recognized as light effective for reconstructing a significant image even if the emission light L2 is observed at a viewing position when reconstructed. By contrast, since the emission light L1 includes significant phase components, it is observed as a signal component effective for image reconstruction. After all, the width G1 of the groove G(x, y) becomes a factor for determining the ratio of the light L1 observed as a signal component among the light rays emitted from the physical cell C(x, y), and becomes a parameter for giving the amplitude information of the signal wave.

Generally, the amplitude information is not expressed by the width G1 of the groove G(x, y), but by the area of the inner surface S1 of the groove G(x, y). In the embodiment shown in FIG. 8, since the length G3 of the groove G(x, y) happens to be set to be always equal to the length C3 of the physical cell C(x, y), the area of the inner surface S1 of the groove G(x, y) is proportional to the extent of the width G1. However, the length G3 of the groove G(x, y) does not necessarily need to be fixed, and both of the width and the length may be changed so that the area of the inner surface S1 of the groove G(x, y) has variations.

If a part having an area corresponding to the specific amplitude (i.e., a part corresponding to the surface S1 of FIG. 8) of the upper surface of the block-like physical cell is hollowed by the depth corresponding to the specific phase (i.e., depth corresponding to the dimension G2 of FIG. 8) so as to form a concave part (i.e., groove G(x, y)) in this way, the amplitude modulation corresponding to the specific amplitude and the phase modulation corresponding to the specific phase can be applied to reconstructing illumination light by the thus constructed physical cell. Even if a convex part, instead of the concave part, is formed on the block-like physical cell, similar modulation processing can be applied. That is, even if the dimension G2 is set at a negative value, and a projection instead of the groove is formed on the physical block shown in FIG. 8, it is possible to produce an optical path difference corresponding to the height of the projection and produce a phase difference. In other words, if a part having an area corresponding to the specific amplitude of the upper surface of the block-like physical cell is protruded by the height corresponding to the specific phase so as to form a convex part, the amplitude modulation corresponding to the specific amplitude and the phase modulation corresponding to the specific phase can also be applied to reconstructing illumination light by the thus constructed physical cell.

Figure 11:
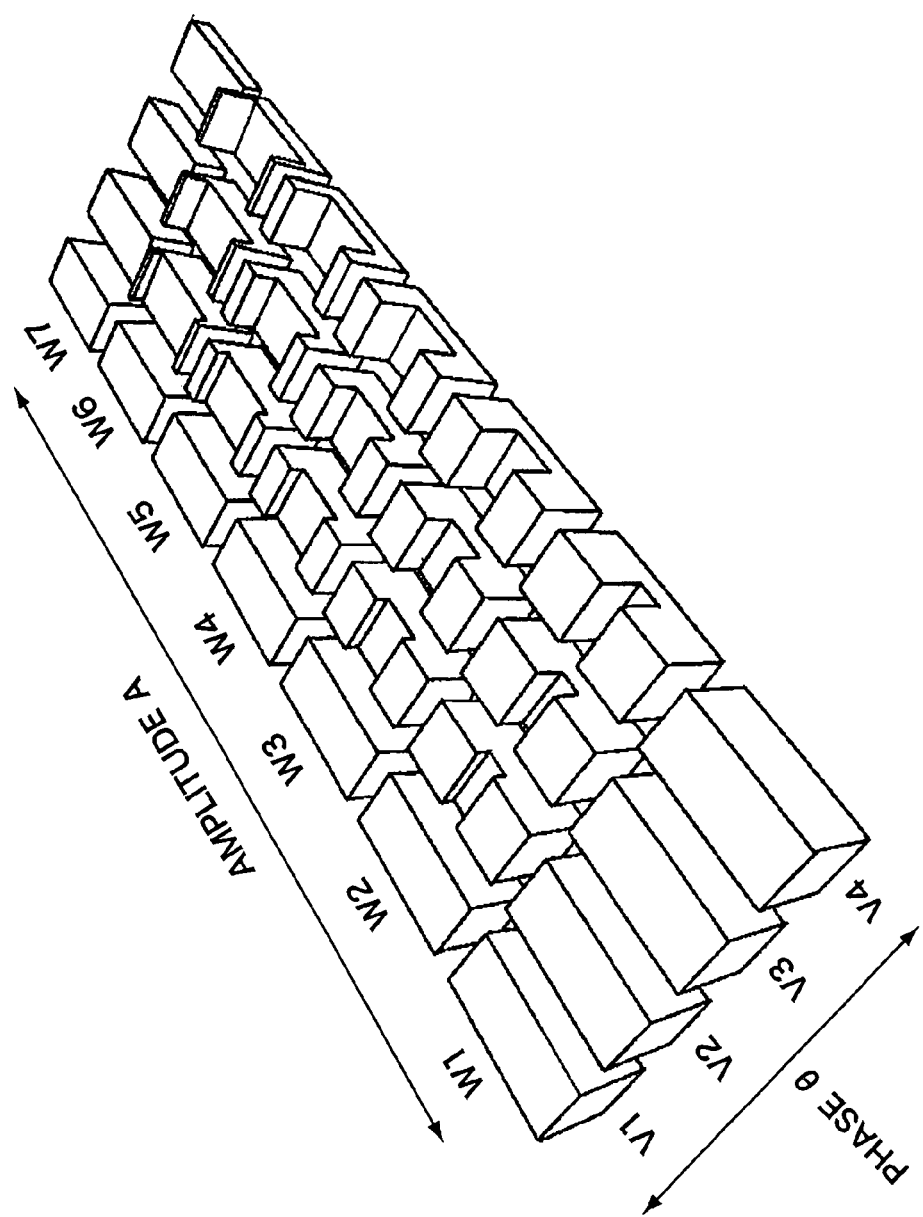
FIG. 11 is a perspective view showing an example in which seven kinds of groove widths and four kinds of depths are determined so that 28 kinds of physical cells in total are prepared in the structure of the physical cell $C(x, y)$ shown in FIG. 8.

The width G1 and depth G2 of the groove can be consecutively changed in the physical cell C(x, y) having the groove G(x, y) shown in FIG. 8, and therefore, theoretically, infinite kinds of physical cells can be prepared. The use of the infinite kinds of physical cells makes it possible to replace the virtual cell with the physical cell having the accurate groove width G1 corresponding to the specific amplitude and the accurate depth G2 corresponding to the specific phase that are defined in the virtual cell. However, practically, it is preferable to predetermine α kinds of groove widths and β kinds of depths so as to prepare α×β kinds of physical cells in total and then select a physical cell closest in necessary optical properties from among the physical cells. FIG. 11 is a perspective view showing an example in which seven kinds of groove widths and four kinds of depths are determined so as to prepare 28 kinds of physical cells in total. Each of the 28 kinds of physical cells is a block-like physical cell formed as shown in FIG. 8, and, in FIG. 11, the physical cells are arranged in the form of a matrix of four rows and 7 columns.

In FIG. 11, the seven columns of the matrix indicate the variation of amplitude A, and the four rows thereof indicate the variation of phase θ. For example, the cell located at column W1 is a cell corresponding to the minimum value of amplitude A, wherein groove width G1=0, i.e., a groove G is not formed at all. Rightward, i.e., toward columns W2 to W7, the cells correspond to greater amplitude A, and the groove width G1 thereof gradually becomes greater. The cell located at column W7 is a cell corresponding to the maximum value of amplitude A, wherein groove width G1=cell width C1, i.e., the entire surface thereof is hollowed. Further, when attention is paid to the rows of the matrix of FIG. 11, the cell located at row V1, for example, is a cell corresponding to the minimum value of phase θ, wherein groove depth G2=0, i.e., a groove G is not formed at all. Downward, i.e., toward rows V2 to V4, the cells correspond to greater phase θ, and the groove depth G2 thereof gradually becomes greater.

<<<§ 4. Optical Element Manufacturing Method by Use of Practical Physical Cells>>>

Now, a description will be provided of a concrete method for manufacturing an optical element (hologram-recording medium) where an object image 10 is recorded by use of 28 kinds of physical cells shown in FIG. 11. First, as shown in FIG. 5, the object image 10 formed by a set of point light sources and a three-dimensional virtual cell set 30 are defined by use of a computer. Herein, respective virtual cells that make up the three-dimensional virtual cell set 30 are block-like cells (at this moment, a groove has not yet been formed) as shown in FIG. 8, and the three-dimensional virtual cell set 30 is formed by arranging the cells two-dimensionally and with equal pitches vertically and horizontally. The dimension of one virtual cell should be, for example, C1=0.6 μm, C2=0.25 μm, and C3=0.25 μm or so. In this case, if the lateral pitch of the cell is 0.6 μm, and the longitudinal pitch is 0.25 μm, the cells can be disposed without any gap. Of course, the dimensional value of each cell shown here is one example, and, in practice, it is possible to set it at an arbitrary dimension if necessary. However, as the cell dimension becomes greater, the visual angle by which a reconstructed image of an object is obtained is narrowed, and the resolution of the object is lowered proportionately. Reversely, as the cell dimension becomes smaller, the processing of forming a concave/convex structure of the physical cell technically becomes difficult. In consideration of the arithmetic processing or the convenience of the processing of the physical cells, it is preferable to dispose the cells with predetermined equal pitches vertically and horizontally though they do not necessarily need to be disposed with equal pitches. Further, the cells are not necessarily need to be disposed in an XY-rectangular coordinates, and it is possible to dispose them in an rθ-polar coordinates.

After the definition of the object image 10 and the definition of the three-dimensional virtual cell set 30 are completed, a representative point is defined in each virtual cell, and then the complex amplitude of the composite wave of each object light that has reached each representative point is calculated as described in § 2, and a specific amplitude and a specific phase are defined for each virtual cell. Thereafter, each virtual cell is replaced with any one of the 28 kinds of physical cells shown in FIG. 11 (in other words, it is replaced with a physical cell closest in optical properties needed for modulation according to the specific amplitude and the specific phase defined in each individual virtual cell), and an optical element is formed as a set of physical cells. At this time, the groove-forming surface of each physical cell (in the case of the physical cell shown in FIG. 8 or FIG. 11, the upper surface) is designed to face the front surface (i.e., the surface facing the object image 10) of the three-dimensional virtual cell set 30 shown in FIG. 5.

In fact, the replacement of the virtual cell with the physical cell is carried out as the processing of forming a given concave/convex structure on the surface of a medium to become an optical element. Since the physical cell is disposed so that its groove is directed forward when each virtual cell of the three-dimensional virtual cell set 30 shown in FIG. 5 is replaced with the physical cell as mentioned above, a finally formed optical element appears as a medium whose surface has a concave/convex structure formed with many grooves. Therefore, the replacement of the virtual cell with the physical cell is carried out as processing of providing data relative to a concave/convex pattern to a drawing device from a computer that stores information for each virtual cell (i.e., information that shows the specific amplitude and the specific phase defined in each virtual cell) and then drawing the concave/convex pattern onto the physical surface of the medium by the drawing device. The processing of drawing a fine concave/convex pattern can be carried out by, for example, a patterning technique that uses an electron-beam drawing device. What is needed to mass-produce the same optical element is to form an original plate in which a desired concave/convex structure is formed by the drawing processing that uses an electron-beam drawing device, for example, and to transfer the concave/convex structure onto many mediums by the stamping step that uses the original plate.

The optical element according to the basic invention is basically formed with a main body layer that is obtained by two-dimensionally arranging the physical cells shown in FIG. 8. However, a protective layer may be placed on the surface of the main body layer if necessary. This protective layer serves to cover the concave/convex surface formed in the surface of the main body layer. The main body layer and the protective layer are made of materials different from each other.

In a transmission type optical element in which incidence light given to each physical cell passes through the main body layer and the protective layer and then turns into emission light, the main body layer and the protective layer must be made of a transparent material and another transparent material, respectively, that are different in the refractive index. Here, let us consider a concrete relationship between the depth of the groove G and the phase when a transmission type optical element (i.e., transmission type physical cell) of a two-layer structure made of such a main body layer and a protective layer is manufactured.

Figure 12:
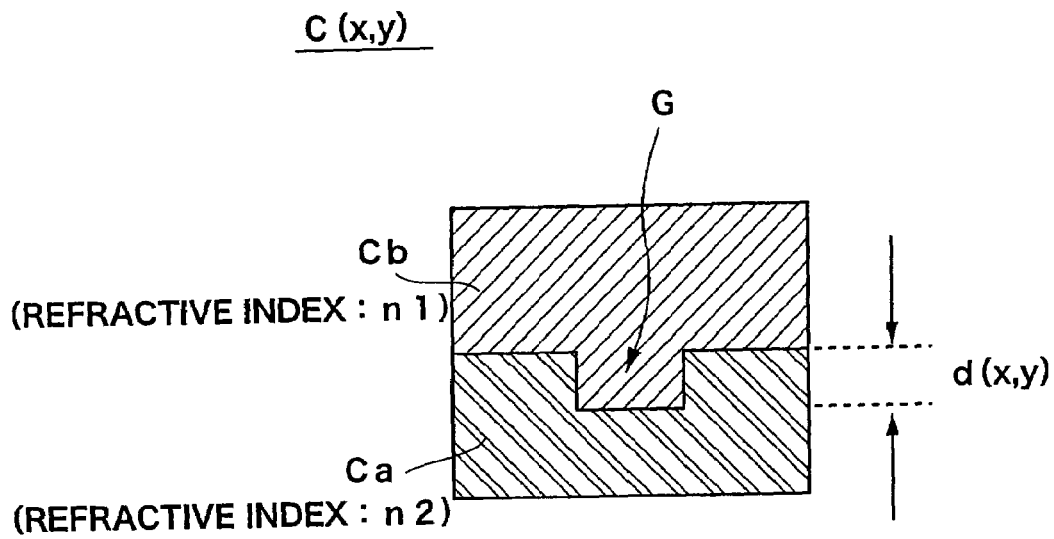
FIG. 12 shows the relationship between the refractive index and the groove depth of each part for the transmission type cell $C(x, y)$.

Now, let us consider a transmission type cell $C(x, y)$ having a structure shown in the sectional view of the upside of FIG. 12. This is a cell having a two-layer structure made of a main body layer Ca in which a groove G whose depth is $d(x, y)$ is formed and a protective layer Cb placed on the upper surface thereof in such a way as to fill the groove G. Herein, the refractive index of a material that forms the protective layer Cb (in other words, the refractive index of a material with which the concave part is filled or a material that constitutes the convex part) is represented as n1, and the refractive index of a material that forms the main body layer Ca is represented as n2. If the maximum depth dmax of the groove G (in other words, the maximum depth of the concave part or the maximum height of the convex part) is set to be dmax=$\lambda/|n1-n2|$, a physical cell can be realized in which phase modulation within the range of 0 through $2\pi$ can be applied to light whose wavelength is $\lambda$. For example, if the wavelength $\lambda$ equals 400 nm ($\lambda$=400 nm) and the difference $|n1-n2|$ in the refractive index equals 2, the maximum depth can be set to be dmax=200 nm (0.2 µm).

In this case, as shown in FIG. 12, the depth $d(x, y)$ corresponding to the specific phase $\theta(x, y)$ can be obtained by the following equations:

If n1>n2, $$d(x,y)=\lambda \cdot \theta(x,y)/2(n1-n2)\pi$$

and, if n1<n2, $$d(x,y)=d\max-\lambda \cdot \theta(x,y)/2(n2-n1)\pi$$

Accordingly, after the specific amplitude and specific phase of a certain virtual cell $C(x, y)$ are obtained as $A(x, y)$ and $\theta(x, y)$, respectively, the specific phase $\theta(x, y)$ is substituted for the above equation so as to calculate a corresponding depth $d(x, y)$, and then a physical cell that has a depth closest to the resulting depth $d(x, y)$ and has a width closest to the dimension corresponding to the specific amplitude $A(x, y)$ is selected from among the 28 kinds of physical cells shown in FIG. 11, and the replacement of the virtual cell $C(x, y)$ with the selected physical cell is carried out. If the protective layer Cb is not provided, the refractive index of air (almost 1) can be used as the refractive index n1 of the protective layer.

On the other hand, let us consider a reflection type cell $C(x, y)$ having a structure shown in the sectional view of the upside of FIG. 13. This is a cell having a two-layer structure made of a main body layer $C\alpha$ in which a groove G whose depth is $d(x, y)$ is formed and a protective layer $C\beta$ placed on the upper surface thereof in such a way as to fill the groove G. In this cell, the boundary between the main body layer $C\alpha$ and the protective layer $C\beta$ serves as a reflecting surface. The reflectance on this reflecting surface is not necessarily to be 100%. The reflecting surface may be a half-mirror having a reflectance of e.g. 50%. The reflecting surface is also provided by inserting a half transparent layer such as a transflector between the main body layer $C\alpha$ and the protective layer $C\beta$. Incidence light that has struck the protective layer $C\beta$ from the upper side of the figure downward is reflected by the reflecting surface and is emitted upward in the figure. Herein, the refractive index of a material that forms the protective layer $C\beta$ (in other words, the refractive index of a material with which the concave part is filled or a material that constitutes the convex part) is represented as n. If the maximum depth dmax of the groove G (in other words, the maximum depth of the concave part or the maximum height of the convex part) is set to be dmax=$\lambda/2n$, a physical cell can be realized in which phase modulation within the range of 0 through $2\pi$ can be applied to light whose wavelength is $\lambda$. For example, if the wavelength $\lambda$ equals 400 nm ($\lambda$=400 nm) and the refractive index equals 2 (n=2), the maximum depth can be set to be dmax=100 nm (0.1 µm).

In this case, as shown in FIG. 13, the depth $d(x, y)$ corresponding to the specific phase $\theta(x, y)$ is obtained by the following equation:

$$d(x,y)=\lambda \cdot \theta(x,y)/4n\pi$$

If the protective layer $C\beta$ is not provided, the refractive index of air (almost 1) can be used as the refractive index n of the protective layer. Accordingly, the maximum depth of the groove G can be set to be dmax=$\lambda/2$, and the depth $d(x, y)$ corresponding to the specific phase $\theta(x, y)$ can be determined by the following equation:

$$d(x,y)=\lambda \cdot \theta(x,y)/4\pi$$

<<§ 5. Modification in Consideration of Convenience of Reconstructive Environment>>>

Figure 14:
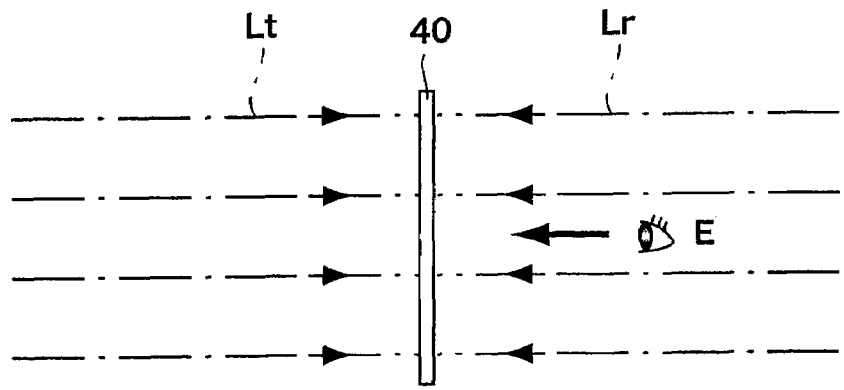
FIG. 14 is a side view showing a basic form in which reconstructing illumination light is projected from a normal direction onto the optical element which is a basic form of the present invention, and an object image recorded as a hologram is observed from the normal direction.

Let us now consider an environment in which reconstructing illumination light is projected onto the optical element manufactured according to the method described above so as to reconstruct the object image 10 recorded as a hologram. FIG. 14 is a side view showing the relationship among an optical element 40 (i.e., hologram-recording medium that uses physical cells), reconstructing illumination light Lt or Lr, and a viewing point E that are used for the reconstruction. If the optical element 40 is a transmission type element that uses transmission type cells, the reconstructing illumination light Lt is projected to the surface opposite to the viewing point E as shown in the figure, and light, that has passed through the optical element 40 is observed at the viewing point E. If the optical element 40 is a reflection type element that uses reflection type cells, the reconstructing illumination light Lr is projected to the surface on the same side as the viewing point E as shown in the figure, and light that has been reflected from the optical element 40 is observed at the viewing point E. In any case, when the optical element 40 is manufactured according to the above method, the most excellent reconstructed image can be obtained in the condition that the reconstructing illumination light Lt or Lr is given as a plane wave of monochromatic light and projected in the normal direction to the recording surface (i.e., a two-dimensional array surface on which physical cells are arranged) of the optical element 40 as shown in FIG. 14 (in other words, reconstructing illumination light is projected so that the wave front becomes parallel with the recording surface of the optical element 40), and the image is observed in the normal direction to the recording surface.

Figure 15:
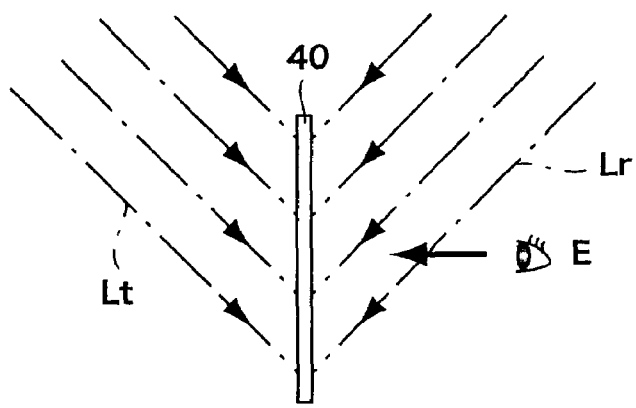
FIG. 15 is a side view showing a form in which reconstructing illumination light is projected from an oblique direction onto the optical element which is a basic form of the present invention, and an object image recorded as a hologram is observed from the normal direction.
Figure 16:
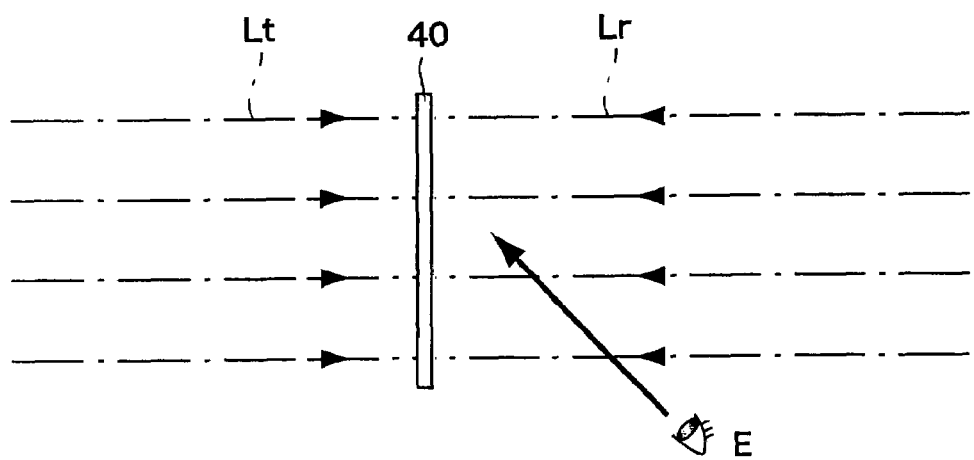
FIG. 16 is a side view showing a form in which reconstructing illumination light is projected from the normal direction onto the optical element which is a basic form of the present invention, and an object image recorded as a hologram is observed from the oblique direction.

However, the actual reconstructive environment of the optical element 40 where the object image 10 is recorded as a hologram does not necessarily lead to the ideal environment shown in FIG. 14. Especially, in the case of the reflection type, since a head of an observing person is located at the position of the viewing point E, a shadow of the person, which makes the excellent reconstruction impossible, appears on the optical element 40 even if the reconstructing illumination light Lr is projected from the direction shown in FIG. 14. Therefore, generally, the actual reconstructive environment has an aspect in which the reconstructing illumination light Lt or Lr is projected in the oblique direction with respect to the recording surface of the optical element 40 so as to observe the reconstructed image at the viewing point E located in the normal direction as shown in FIG. 15, or, alternatively, an aspect in which the reconstructing illumination light Lt or Lr is projected in the normal direction to the recording surface of the optical element 40 so as to observe the reconstructed image at the viewing point E located in the oblique direction as shown in FIG. 16, or, alternatively, an aspect in which both the projecting direction of the reconstructing illumination light Lt or Lr and the observing direction with respect to the viewing point E are set as the oblique direction.

What is needed to manufacture the optical element 40 by which an excellent reconstructed image can be obtained in the actual reconstructive environment is to carry out phase-correcting processing in which the specific phase defined for each virtual cell is corrected, in consideration of the direction of the illumination light projected when reconstructed and the position of the viewing point when reconstructed.

Figure 17:
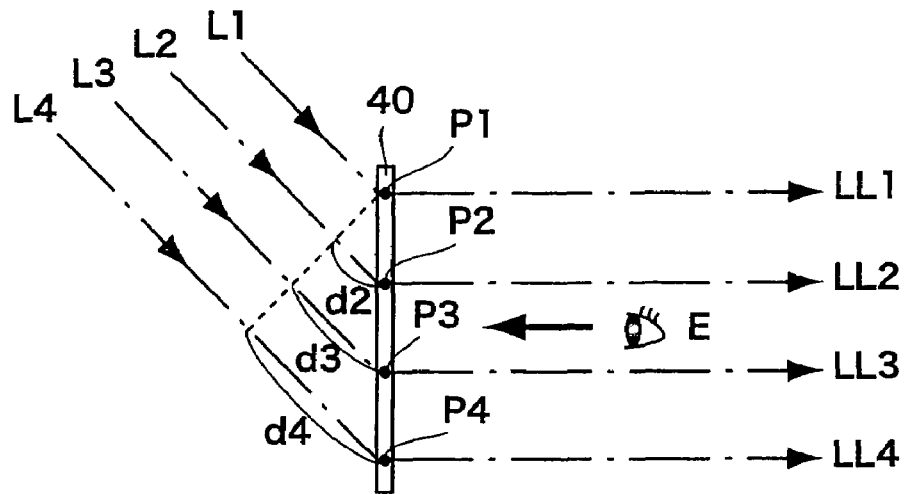
FIG. 17 is a side view showing a principle according to which specific phase is subjected to corrective processing in order to make an optical element that corresponds to a reconstructing environment shown in FIG. 15.

For example, let us consider a case in which, as shown in FIG. 17, reconstructing illumination light rays L1 through L4 are projected in the oblique direction, and light rays LL1 through LL4 that have undergone modulation of the amplitude and the phase as a result of passing through the optical element 40 (in other words, light rays LL1 through LL4 have the reconstructed wave front of the object light emitted from the object image 10) are observed at the viewing point E located in the normal direction. If the reconstructing illumination light rays L1 through L4 are each a monochrome plane wave whose wavelength is λ and if the reconstructing illumination light is projected onto the optical element 40 in the oblique direction, an optical path difference will have already arisen when the light reaches each point P1 through P4 on the optical element 40, and incidence light at each point P1 through P4 will have already generated a phase difference. For example, the incidence light rays upon the positions of points P2, P3, and P4 are longer in the optical path length by d2, d3, and d4, respectively, than the incidence light ray upon the position of point P1. Therefore, the incidence light has already generated a phase difference in proportion to the optical path difference. Therefore, if there is the supposition that "the optical element 40 is manufactured by which an excellent reconstructed image can be obtained in the reconstructive environment shown in FIG. 17", the specific phase about each virtual cell can be calculated according to the above-mentioned method, and thereafter the processing of correcting each specific phase can be carried out in accordance with the position of the cell. For example, there is no need to correct the cell located at the position of point P1 of FIG. 17, and the cell located at the position of point P2 undergoes the correction of the specific phase so as to cancel a phase difference caused by the optical path difference d2. Accordingly, if the optical element 40 is manufactured while carrying out the correction of the specific phase, an excellent reconstructed image can be given by the light rays LL1 through LL4 emitted toward the viewing point E.

Figure 18:
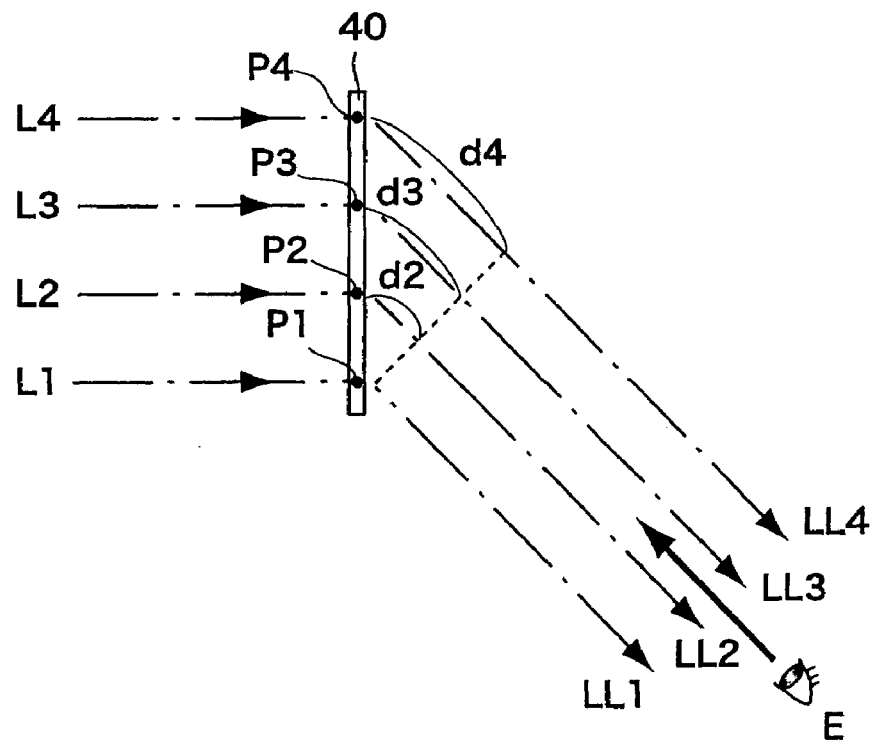
FIG. 18 is a side view showing a principle according to which specific phase is subjected to corrective processing in order to make an optical element that corresponds to a reconstructing environment shown in FIG. 16.

This corrective processing to the specific phase is likewise carried out in a case in which, as shown in FIG. 18, the reconstructing illumination light rays L1 through L4 are projected in the normal direction so as to observe the light rays LL1 through LL4 that have undergone modulation of the amplitude and the phase as a result of passing through the optical element 40 (i.e., light that has reconstructed the wave front of the object light from the object image 10) at the viewing point E located in the oblique direction. That is, if the reconstructing illumination light rays L1 through L4 are each a monochrome plane wave whose wavelength is λ and if the reconstructing illumination light rays are projected onto the optical element 40 in the normal direction, no optical path difference occurs when the light ray reaches each point P1 through P4 on the optical element 40, and the phases of the incidence light rays upon points P1 through P4 coincide with each other. However, a difference arises among the optical path lengths from points P1 through P4 to the viewing point E that the emission light emitted therefrom reaches, and a phase difference will arise when observed at the viewing point E. For example, the emission light rays from the positions of points P2, P3, and P4 are longer in the optical path length by d2, d3, and d4, respectively, than the emission light ray from the position of point P1. Therefore, the emission light has generated a phase difference in proportion to the optical path difference at the position of the viewing point E. Therefore, if there is the supposition that "the optical element 40 is manufactured by which an excellent reconstructed image can be obtained in the reconstructive environment shown in FIG. 18", the specific phase about each virtual cell can be calculated according to the above-mentioned method, and thereafter the processing of correcting each specific phase can be carried out in accordance with the position of the cell. For example, there is no need to correct the cell located at the position of point P1 of FIG. 18, and the cell located at the position of point P2 undergoes the correction of the specific phase so as to cancel a phase difference caused by the optical path difference d2. Accordingly, if the optical element 40 is manufactured while carrying out the correction of the specific phase, an excellent reconstructed image can be provided by the light rays LL1 through LL4 emitted toward the viewing point E.

The corrective processing to the specific phase for the transmission type optical element 40 was described above. The same principle of the corrective processing applies to the reflection type optical element 40.

On the other hand, concerning the wavelength of the reconstructing illumination light, a case where monochromatic light whose wavelength is λ can be used as reconstructing illumination light is extremely rare in the actual reconstructive environment, and therefore, normally, a case where the reconstruction is carried out under reconstructing illumination light close to white can be regarded as general. If the reconstruction is carried out by use of reconstructing illumination light that includes a plurality of wavelength components, different phase modulation is performed for light having each individual wavelength, and therefore an excellent reconstructed image cannot be obtained. Concretely, a reconstructed image is formed as if images with various colors are superimposed on each other with slight incongruity.

Figure 19:
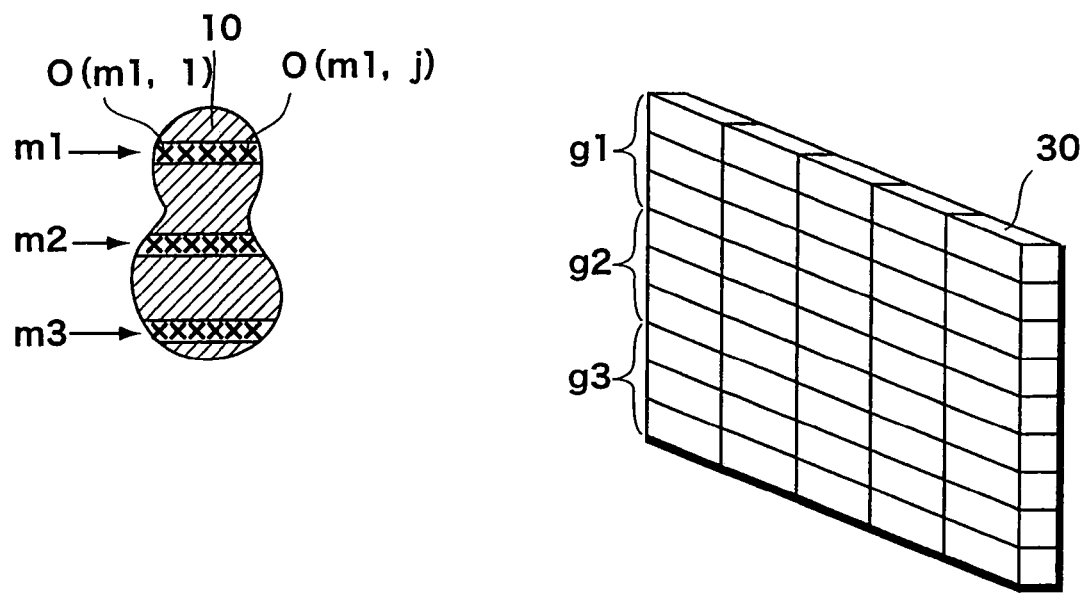
FIG. 19 is a perspective view showing a technique for making an optical element that corresponds to a reconstructing environment in which white reconstructing illumination light is used.
Figure 20:
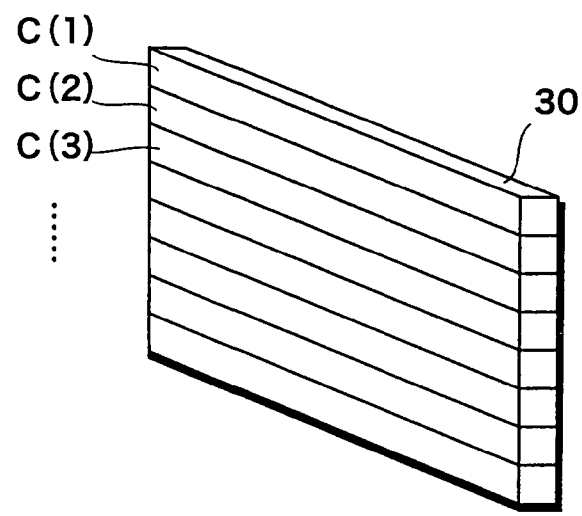
FIG. 20 is a perspective view showing an example in which three-dimensional cells are arranged like a one-dimensional matrix so as to construct a three-dimensional virtual cell set 30.

Therefore, in order to obtain a fairly excellent reconstructed image even in the reconstructive environment that uses white reconstructing illumination light, a method, such as that shown in FIG. 19, should be applied when a complex amplitude distribution of object light is calculated. Like the system shown in FIG. 5, a system shown in FIG. 19 is used to define the object image 10 and the three-dimensional virtual cell set 30 on a computer and calculate for obtaining a distribution of the totaled complex amplitude of each object light emitted from the object image 10 on the three-dimensional virtual cell set 30. Herein, the three-dimensional virtual cell set 30 is constructed by arranging virtual cells horizontally and vertically, and is a cell set that consists of the virtual cells arranged on the two-dimensional matrix. Representative points are defined in the virtual cells, respectively.

When the technique described herein is employed, the totaled complex amplitude at the position of each representative point is calculated by the following method. First, a plurality of M point-light-source rows each of which extends horizontally and which are mutually arranged vertically are defined on the object image 10. In the example of the figure, M=3, and three point light source rows m1, m2, and m3 are defined. Each point light source row includes a plurality of point light sources arranged horizontally. For example, a point light source row m1 includes j point light sources O(m1, 1), O(m1,2), ..., O(m1,j). On the other hand, on the side of the three-dimensional virtual cell set 30, M groups in total are defined by defining groups of virtual cells that belong to a plurality of rows contiguous vertically as one group in the two-dimensional matrix. In the example of the figure, three groups in total are defined as M=3. That is, a first group g1 consists of virtual cells that belong to first through third rows, a second group g2 consists of virtual cells that belong to fourth through sixth rows, and a third group g3 consists of virtual cells that belong to seventh through ninth rows.

The M point light source rows are thus defined on the side of the object image 10, and the M groups are defined on the side of the three-dimensional virtual cell set 30. Thereafter, the M point light source rows and the M groups are caused to correspond to each other in accordance with the arrangement order concerning the vertical direction. That is, in the example of the figure, the uppermost point light source row m1 is caused to correspond to the uppermost group g1, the middle point light source row m2 is caused to correspond to the middle group g2, and the lowermost point light source row m3 is caused to correspond to the lowermost group g3. Thereafter, on the supposition that the object light emitted from a point light source in the m-th point light source row (m=1 to M) reaches only the virtual cell that belongs to the m-th group, the totaled complex amplitude at the position of each representative point is calculated. For example, the object light emitted from the point light sources O(m1,1), O(m1,2), ..., O(m1,j) that belong to the point light source row m1 in FIG. 19 is regarded as reaching only the virtual cells that belongs to the group g1 (virtual cells arranged in the first to third rows), and as not reaching the virtual cells that belongs to the groups g2 and g3, and the totaled complex amplitude is calculated. In other words, the calculation of the totaled complex amplitude at the position of the representative point of the virtual cell that belongs to the group g1 is carried out in consideration of only the object light emitted from the point light sources O(m1,1), O(m1,2), ..., O(m1,j) that belong to the point light source row m1, not in consideration of the object light emitted from the point light sources that belong to the point light source rows m2 and m3.

Actually, the object image 10 cannot be recorded as an original hologram if it is recorded under these conditions. After all, the basic principle of the hologram resides in that all information for the object image 10 is recorded onto any places of the recording surface, and thereby a stereoscopic image can be reconstructed. If the object image 10 is recorded under the conditions mentioned above, only information of a part of the point-light-source row m1 (i.e., part of the upper portion of the object image 10) is recorded in the area of the group g1. As a result, a stereoscopic reconstructed image as an original hologram cannot be obtained. Concretely, stereoscopic vision relative to the horizontal direction can be given, but stereoscopic vision relative to the vertical direction becomes insufficient. However, if the object image 10 is recorded under these conditions, a more excellent reconstructed image (i.e., an even clearer reconstructed image including the fact that the stereoscopic vision relative to the vertical direction is insufficient) can be obtained in the reconstructive environment that uses white reconstructing illumination light. The reason is that, when reconstructed, an effect to control the wavelength distribution of the reconstructing light concerning with the vertical direction can be obtained by recording the object image 10 in such a way as to divide it into parts concerning with the vertical direction.

<<<§ 6. Points of Improvement of an Optical Element of the Present Invention>>>

Though specific examples of the arrangement of the optical element using three-dimensional cells, disclosed as a basic invention in the above-mentioned U.S. Pat. No. 6,618,190, have been described above, with this optical element, since noise components become mixed in during reconstruction, clear reconstruction results cannot be obtained necessarily. This is because a part of the incident light that is provided as illumination light in the reconstruction process or a part of the reflected light of this incident light is observed as 0th-order diffraction light. The cause as to why this 0th-order diffraction light is observed shall now be described.

With a transmission type three-dimensional cell C(x, y) shown in FIG. 9, amplitude information is recorded as width G1 of a groove G(x, y) and phase information is recorded as depth G2 of groove G(x, y) because, as described above, when a light L1, which has been made incident on an internal surface S1 of groove G(x, y), is observed as transmitted light, the intensity of this transmitted light depends on the area (that is, width G1 of groove G(x, y)) of surface S1 and the phase of this transmitted light depends on the optical path length of passage through the medium of refractive index n2 (that is, depth G2 of groove G(x, y)). Meanwhile, a light L2, which is made incident on an external surface S2 of groove G(x, y), is not subject to modulation by groove G(x, y). Emitted light L2 thus does not contain any phase components of significance, and even if such emitted light L2 is observed at a viewing point position in a reconstruction process, it is observed only as a so-called background noise component and is not recognized as effective light for reconstruction of an image of any significance.

The same applies to a reflection type three-dimensional cell C(x, y) shown in FIG. 10. When a light L1, which has been made incident on an internal surface S1 of groove G(x, y), is observed as reflected light, the intensity of this reflected light depends on the area (that is, width G1 of groove G(x, y)) of surface S1 and the phase of this reflected light depends on the optical path length of passage through the medium of refractive index n1 (that is, depth G2 of groove G(x, y)). Reflected light L1, which is observed at a viewing point position, thus contains amplitude information, which is recorded as width G1, and phase information, which is recorded as depth G2. Meanwhile, a light L2, which is made incident on an external surface S2 of groove G(x, y), is not subject to modulation by groove G(x, y). Reflected light L2 thus does not contain any phase components of significance, and even if such reflected light L2 is observed at a viewing point position in a reconstruction process, it is observed only as a so-called background noise component and is not recognized as effective light for reconstruction of an image of any significance.

Emitted light L2 in the example shown in FIG. 9 and reflected light L2 in the example shown in FIG. 10 are thus components corresponding to being 0th-order diffraction light. Whereas light L1, which is modulated by groove G(x, y), is light that is observed as a signal component, light L2 (0th-order diffraction light), which is not modulated by groove G(x, y), is light that is observed as a noise component.

Since this noise component light does not contain information of any significance, it is recognized simply as background noise by an observer, and is preferably eliminated in order to obtain a clear image with a low amount of noise components. An object of the present invention is to restrain the generation of light L2 (0th-order diffraction light), which is observed as a noise component, as much as possible. Specific methods for this purpose shall now be described by way of several embodiments.

(1) First Groove Type Embodiment

Figure 21:
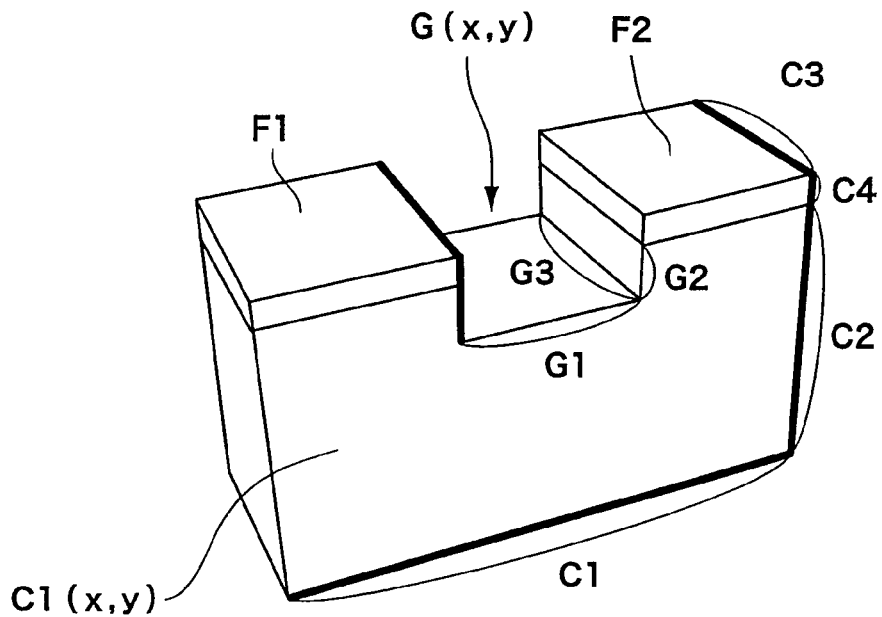
FIG. 21 is a perspective view of an example of the structure of a physical cell C1(x, y) of a first groove type embodiment of the present invention.
Figure 22:
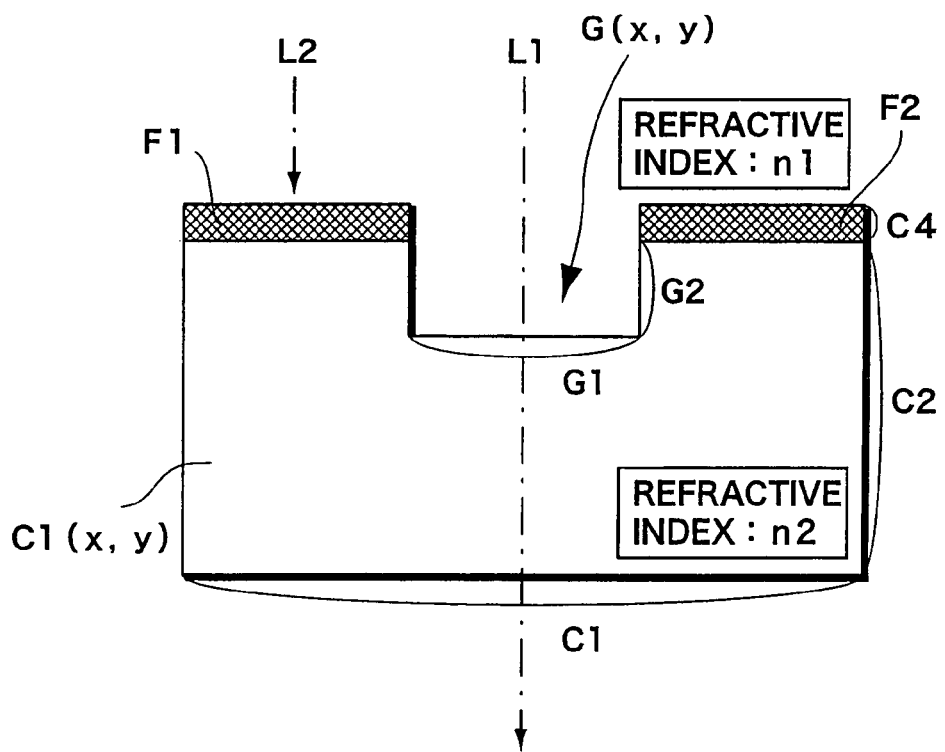
FIG. 22 is a sectional view of the physical cell shown in FIG. 21 (hatching of the main body portion of the cell is omitted).

FIG. 21 is a perspective view of an example of the structure of a physical cell C1(x, y) of a first groove type embodiment of the present invention, and FIG. 22 is a sectional view of this physical cell (hatching of the main body portion of the cell is omitted). Though this physical cell C1(x, y) has substantially the same structure as physical cell C(x, y), shown in FIG. 8, it differs in having light blocking layers F1 and F2 formed at portions besides a groove G(x, y) on the upper surface. In the present example, light blocking layers F1 and F2 are films formed of chromium and thickness C4 of each is approximately 0.2 µm. Needless to say, the material and thickness of light blocking layers F1 and F2 are not restricted in particular as long as these layers provide an adequate light blocking function.

The function of light blocking layers F1 and F2 is made clear in the sectional view of FIG. 22. Like physical cell C(x, y), shown in FIG. 9, the present physical cell C1(x, y) is a transmission type cell, and light L1 that is transmitted through the interior of groove G(x, y) is observed as modulated light. However, light L2, which is illuminated outside groove G(x, y), is blocked by light blocking layer F1 or F2 and prevented from propagating into the interior of the cell. Light reflecting films or light absorbing films may be used as light blocking layers F1 and F2. In the former case, light L2, which is illuminated from above onto light blocking layer F1 or F2, is reflected upward, and in the latter case, the light is absorbed. In either case, light L2 will not proceed inside the cell. Needless to say, light blocking layers F1 and F2 may be formed of films having both the properties of a light reflecting film and the properties of a light absorbing film. For practical use, light blocking layers F1 and F2 may be formed, for example, of a chromium film.

The same applies in the opposite case where light is illuminated from the lower side of the figure and is observed at the upper side. Though light that is transmitted through the interior of groove G(x, y) is observed at the upper side, light outside groove G(x, y) is blocked by light blocking layer F1 or F2.

Physical cell C1(x, y), shown in FIG. 21 and FIG. 22, is thus formed of a light transmitting material, has a specific amplitude and a specific phase defined therein, and has a first region (internal region of the groove through which light L1 is transmitted), which is a portion having an area that is in accordance with the specific amplitude defined in the cell, and a second region (region lying outside the groove and onto which light L2 is illuminated), which comprises the portions except the first region, defined on the upper surface of the cell, with the first region being formed by the bottom surface of groove G(x, y), having a depth that is in accordance with the specific phase defined in the cell, and light blocking layers F1 and F2 being formed on the second region. The cell itself thus has specific optical characteristics such that when a predetermined incident light is provided to the upper surface or the lower surface of the cell, transmission emitted light, with which the amplitude and phase of the incident light have been changed in accordance with the specific amplitude and specific phase defined in the cell, is obtained from the lower surface or the upper surface of the cell.

By thus providing light blocking layers F1 and F2, light L2 (0th-order diffraction light), which is observed as a noise component, can be blocked and just light L1, which is observed as a signal component, can be guided selectively to the observation point. A clear reconstructed image with a low amount of noise components can thus be obtained.

By arranging light blocking layers F1 and F2 as light absorbing layers and arranging the bottom surface of groove G(x, y) to form a reflecting surface, physical cell C1(x, y), shown in FIG. 21 and FIG. 22, can be used as a reflection type cell that is based on the principles illustrated in FIG. 10 (a cell of the type with which illumination reconstruction light is illuminated from the upper side and observation is performed from the upper side). That is, whereas light L1, which is reflected by the bottom surface of groove G(x, y), is observed as a signal component light, light L2, which is illuminated outside groove G(x, y), is absorbed by light absorbing layers F1 and F2 and observation of light L2, which is a noise component, can thus be restrained.

(2) Second Groove-Type Embodiment

Figure 23:
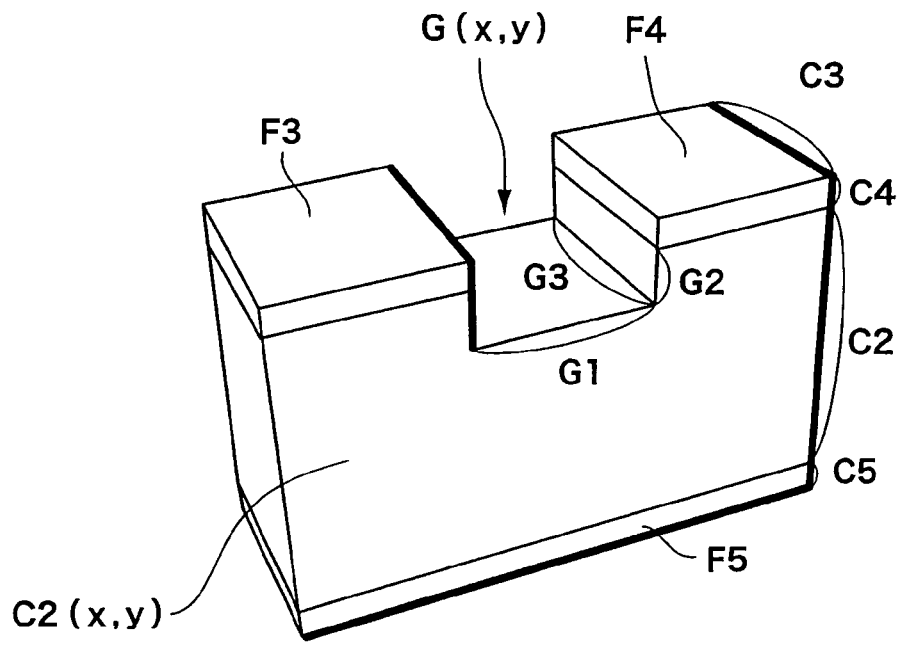
FIG. 23 is a perspective view of an example of the structure of a physical cell C2(x, y) of a second groove type embodiment of the present invention.
Figure 24:
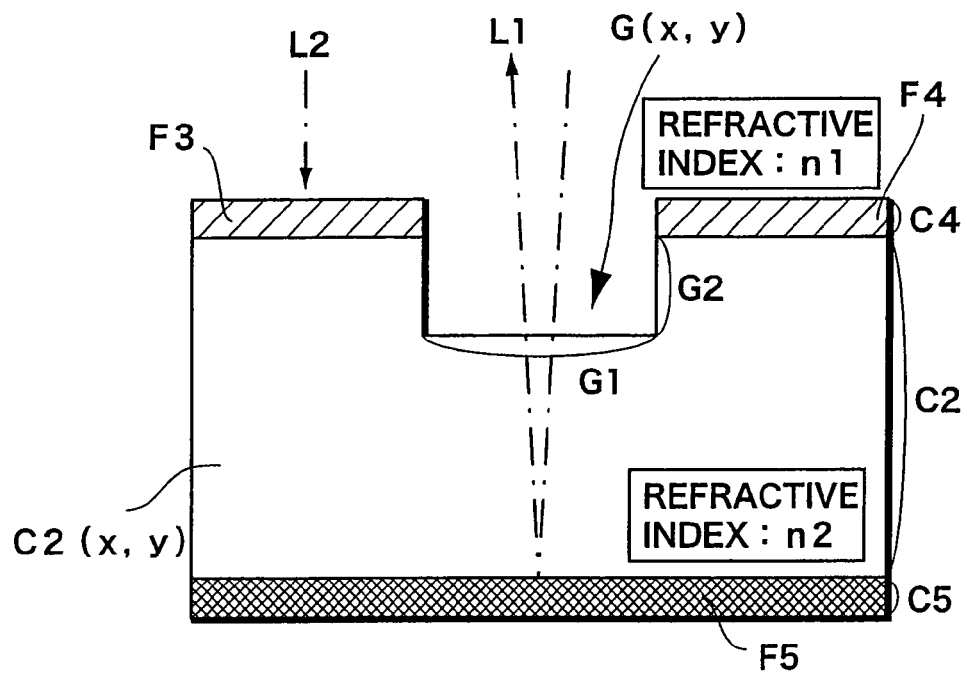
FIG. 24 is a sectional view of the physical cell shown in FIG. 23 (hatching of the main body portion of the cell is omitted).

FIG. 23 is a perspective view of an example of the structure of a physical cell C2(x, y) of a second groove type embodiment of the present invention, and FIG. 24 is a sectional view of this physical cell (hatching of the main body portion of the cell is omitted). Though this physical cell C2(x, y) has substantially the same structure as physical cell C(x, y), shown in FIG. 8, it differs in having light absorbing layers F3 and F4 formed at portions of the upper surface besides groove G(x, y) and having a light reflecting layer F5 formed on the lower surface. In the present example, light absorbing layers F3 and F4 are films formed of chromium and thickness C4 of each is approximately 0.2 µm. Light reflecting layer F5 is a film formed of aluminum and thickness C5 thereof is approximately 0.2 µm. Needless to say, the materials and thicknesses of light absorbing layers F3 and F4 and light reflecting layer F5 are not restricted in particular as long as these layers provide adequate light absorbing and reflecting functions.

The functions of light absorbing layers F3 and F4 and light reflecting layer F5 are made clear in the sectional view of FIG. 24. The present physical cell C2(x, y) is a reflection type cell, and light L1, which is transmitted through the interior of groove G(x, y), propagates inside the cell, is directed upward by being reflected by light reflecting layer F5, and is observed as modulated light. However, light L2, which is illuminated outside groove G(x, y), is absorbed by light absorbing layers F3 and F4.

Physical cell C2(x, y), shown in FIG. 23 and FIG. 24, is thus formed of a light transmitting material, has a specific amplitude and a specific phase defined therein, and has a first region (internal region of the groove through which light L1 is transmitted), which is a portion having an area that is in accordance with the specific amplitude defined in the cell, and a second region (region lying outside the groove and onto which light L2 is illuminated), which comprises the portions except the first region, defined on the upper surface of the cell, with the first region being formed by the bottom surface of groove G(x, y), having a depth that is in accordance with the specific phase defined in the cell, light absorbing layers F3 and F4 being formed on the second region, and the light reflecting layer being formed on the lower surface of the cell. The cell itself thus has specific optical characteristics such that when a predetermined incident light is provided from the upper surface of the cell, reflection emitted light, with which the amplitude and phase of the incident light have been changed in accordance with the specific amplitude and specific phase defined in the cell, is obtained from the upper surface of the cell.

By thus providing light absorbing layers F3 and F4, light L2 (0th-order diffraction light), which is observed as a noise component, can be blocked and just light L1, which is observed as a signal component, can be guided selectively to the observation point. A clear reconstructed image with a low amount of noise components can thus be obtained.

(3) Third Groove Type Embodiment

Figure 25:
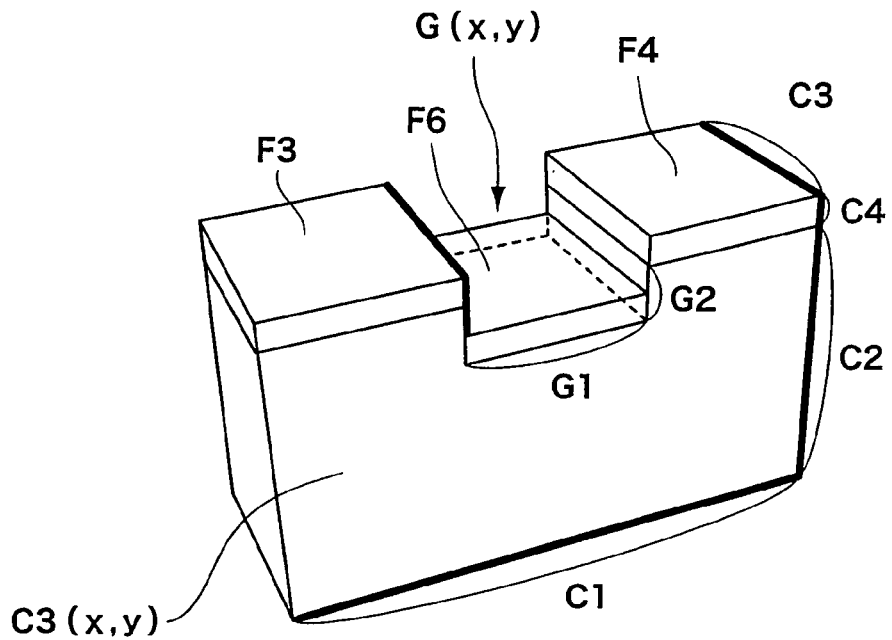
FIG. 25 is a perspective view of an example of the structure of a physical cell C3(x, y) of a third groove type embodiment of the present invention.
Figure 26:
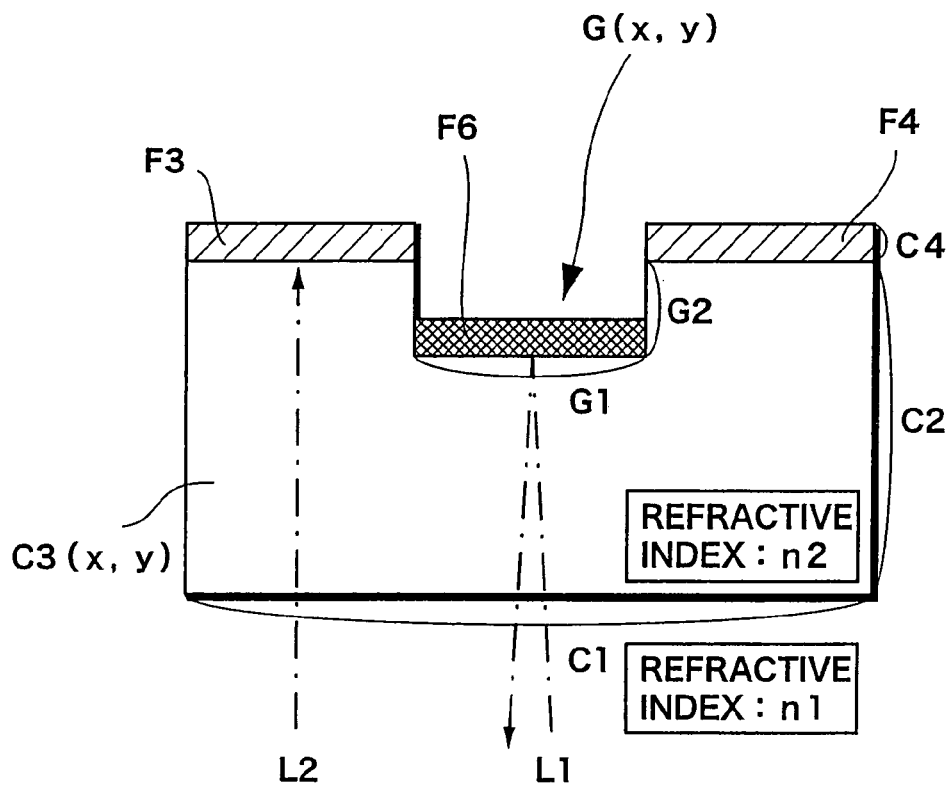
FIG. 26 is a sectional view of the physical cell shown in FIG. 25 (hatching of the main body portion of the cell is omitted).

FIG. 25 is a perspective view of an example of the structure of a physical cell C3(x, y) of a third groove type embodiment of the present invention and FIG. 26 is a sectional view of this physical cell (hatching of the main body portion of the cell is omitted). As with physical cell C2(x, y), shown in FIG. 23 and FIG. 24, the present physical cell C3(x, y) has light absorbing layers F3 and F4 formed at portions of the upper surface besides groove G(x, y). However, whereas physical cell C2(x, y) has light reflecting layer F5 formed on the lower surface of the cell, physical cell C3(x, y) differs in having a light reflecting layer F6 formed on the bottom surface of groove G(x, y). Light absorbing layers F3 and F4 are films formed of chromium in the present example as well and thickness C4 of each layer is approximately 0.2 μm. Light reflecting layer F6 is a film formed of aluminum and thickness thereof is approximately 0.2 μm. Needless to say, the materials and thicknesses of light absorbing layers F3 and F4 and light reflecting layer F6 are not restricted in particular as long as these layers provide adequate light absorbing and reflecting functions.

The functions of light absorbing layers F3 and F4 and light reflecting layer F6 are made clear in the sectional view of FIG. 26. The present physical cell C3(x, y) is a reflection type cell, and light L1, which is illuminated from the lower side, propagates inside the cell, is directed downward by being reflected by light reflecting layer F6 at the bottom part of groove G(x, y), and is observed as modulated light at an observation point at the lower side. However, light L2, which is illuminated outside groove G(x, y), propagates inside the cell and becomes absorbed by light absorbing layers F3 and F4.

Physical cell C3(x, y), shown in FIG. 25 and FIG. 26, is thus formed of a light transmitting material, has a specific amplitude and a specific phase defined therein, and has a first region (internal region of the groove that is reached by light L1), which is a portion having an area that is in accordance with the specific amplitude defined in the cell, and a second region (region lying outside the groove and being reached by light L2), which comprises the portions except the first region, defined on the upper surface of the cell, with the first region being formed by the bottom surface of groove G(x, y), having a depth that is in accordance with the specific phase defined in the cell, light absorbing layers F3 and F4 being formed on the second region, and light reflecting layer F6 being formed on the first region. The cell itself thus has specific optical characteristics such that when a predetermined incident light is provided from the lower surface of the cell, reflection emitted light, with which the amplitude and phase of the incident light have been changed in accordance with the specific amplitude and specific phase defined in the cell, is obtained from the lower surface of the cell.

By thus providing light absorbing layers F3 and F4, light L2 (0th-order diffraction light), which is observed as a noise component, can be blocked and just light L1, which is observed as a signal component, can be guided selectively to the observation point. A clear reconstructed image with a low amount of noise components can thus be obtained.

Figure 27:
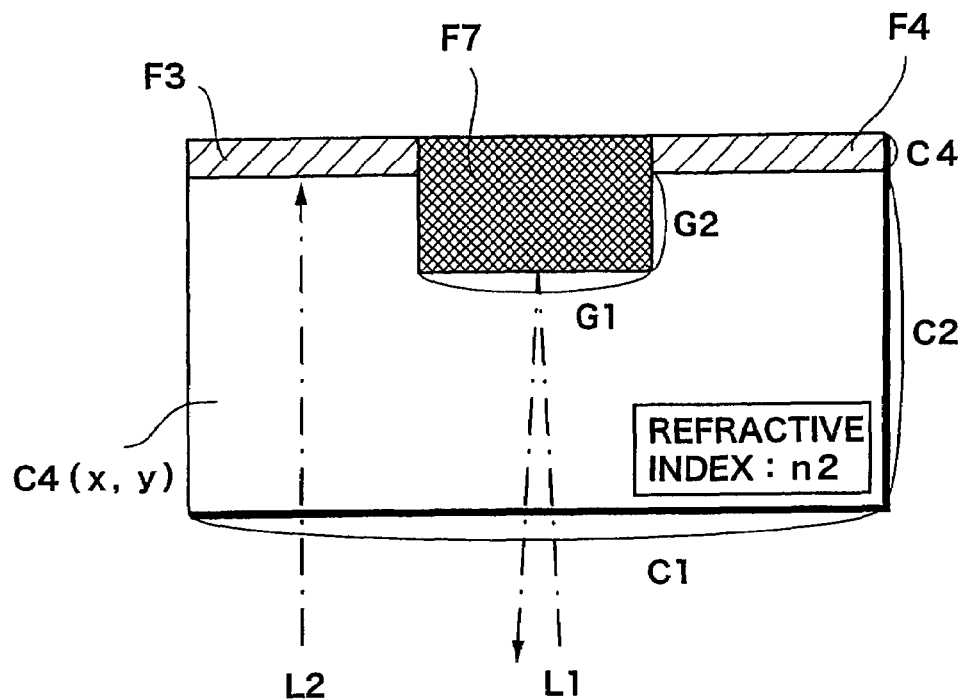
FIG. 27 is a sectional view of a modification example of the physical cell shown in FIG. 26 (hatching of the main body portion of the cell is omitted).
Figure 28:
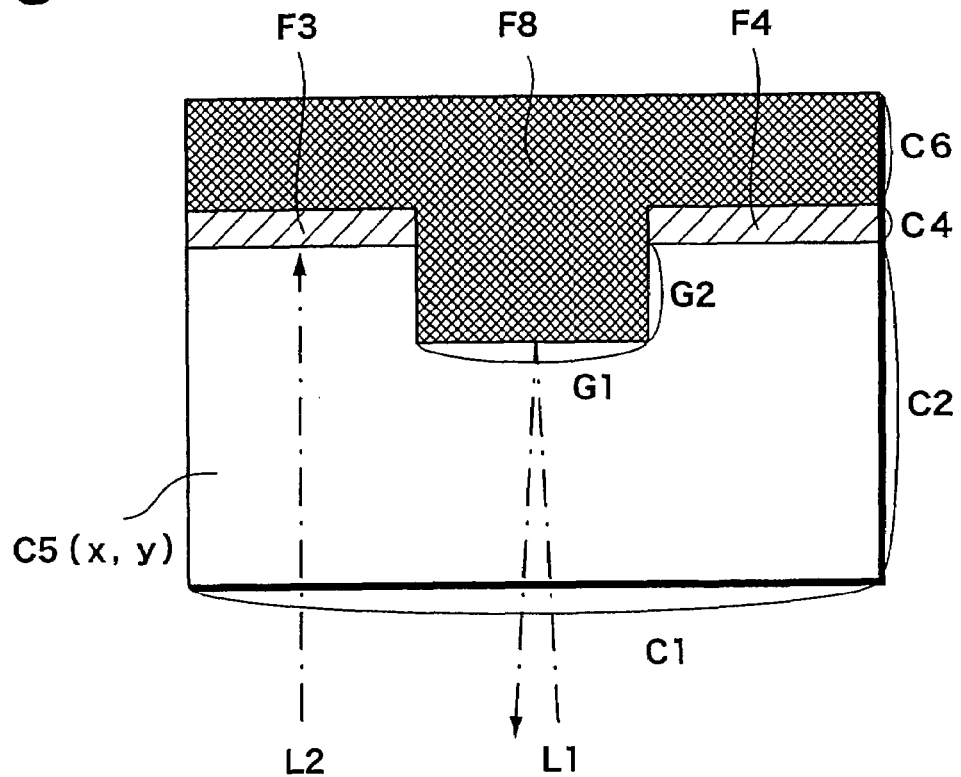
FIG. 28 is a sectional view of another modification example of the physical cell shown in FIG. 26 (hatching of the main body portion of the cell is omitted).

Though with the example shown in FIG. 25 and FIG. 26, light reflecting layer F6 is formed just near the bottom part of groove G(x, y), there are no restrictions in regard to the thickness of light reflecting layer F6. For example, with a physical cell C4(x, y), shown in FIG. 27, a light reflecting layer F7, with a thickness suited for filling the entirety of the interior of groove G(x, y), is formed. Also, a physical cell C5(x, y), shown in FIG. 28, is an example wherein an even thicker light reflecting layer F8 is formed. This light reflecting layer F8 has a structure that covers the upper surfaces of light absorbing layers F3 and F4 by a thickness C6.

(4) Fourth Groove Type Embodiment

Figure 29:
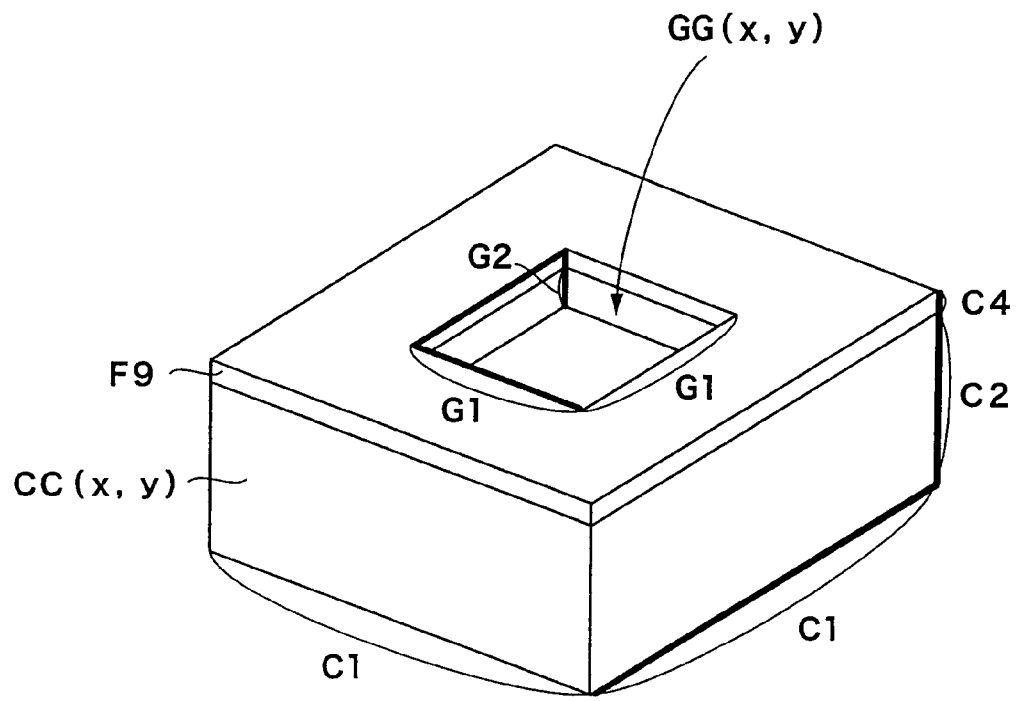
FIG. 29 is a perspective view of an example of the structure of a physical cell CC(x, y) of a fourth groove type embodiment of the present invention.
Figure 30:
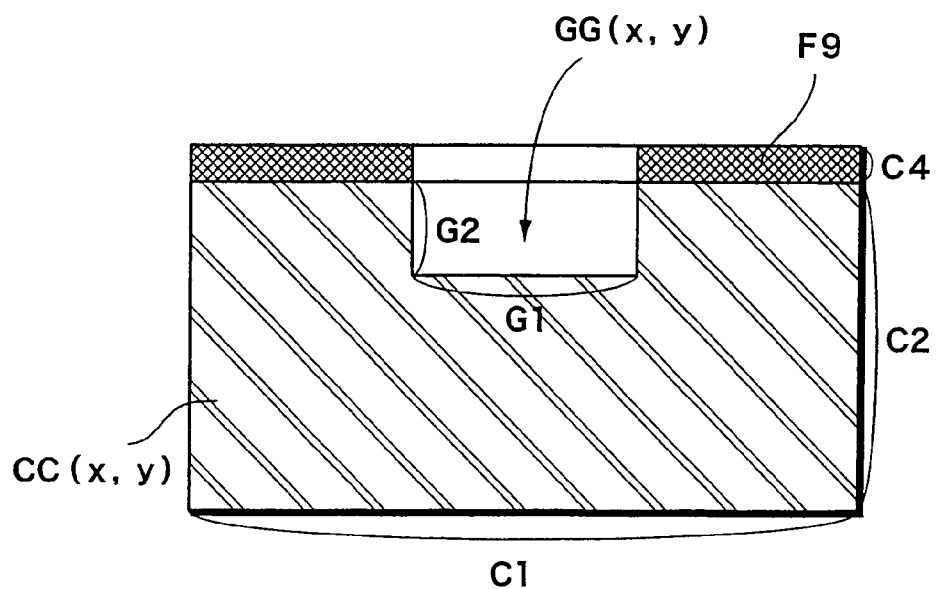
FIG. 30 is a sectional view of the physical cell shown in FIG. 29.

FIG. 29 is a perspective view of an example of the structure of a physical cell CC(x, y) of a fourth groove type embodiment of the present invention and FIG. 30 is a sectional view of this physical cell. As with physical cell C1(x, y), shown in FIG. 21 and FIG. 22, the present physical cell CC(x, y) is a transmission type cell and has a light absorbing layer F9 formed at portions of the upper surface besides a groove GG(x, y). However, whereas groove G(x, y) of each of the previous embodiments is formed to pass through from the front to the rear of the main cell body, the present groove GG(x, y) has a structure that is formed by hollowing a central portion of the main cell body and groove GG(x, y) is surrounded by the main cell body at four sides. In the case of the illustrated example, groove GG(x, y) has a square opening with each side being of dimension G1.

Physical cell CC(x, y), shown in FIG. 29, though differing somewhat in shape from physical cell C1(x, y), shown in FIG. 21, is exactly the same in essential function as physical cell C1(x, y). That is, a first region (the bottom surface of groove GG(x, y) having a square opening with each side being of dimension G1), which is a portion having an area that is in accordance with the specific amplitude defined in the cell, and a second region, which comprises the portion (square-frame-like portion surrounding the opening) besides the first region, are defined on the upper surface of the cell, and light blocking layer F9 is formed on the second region. Each individual cell thus has specific optical characteristics such that when a predetermined incident light is provided to the upper surface or the lower surface of the cell, transmission emitted light, with which the amplitude and phase of the incident light have been changed in accordance with the specific amplitude and specific phase defined in the cell, is obtained from the lower surface or the upper surface of the cell. That is, whereas light that is transmitted through the interior of groove GG(x, y) reaches an observation point as transmission emitted light upon being modulated in accordance with the specific amplitude and specific phase, light that is illuminated outside groove GG(x, y) is blocked by light blocking layer F9 and is restrained from being observed as a noise component.

Though just a transmission type physical cell was described here, a reflection type physical cell having a groove GG(x, y) such as shown in FIG. 29 can also be realized.

(5) Convex Type Embodiments

Figure 31:
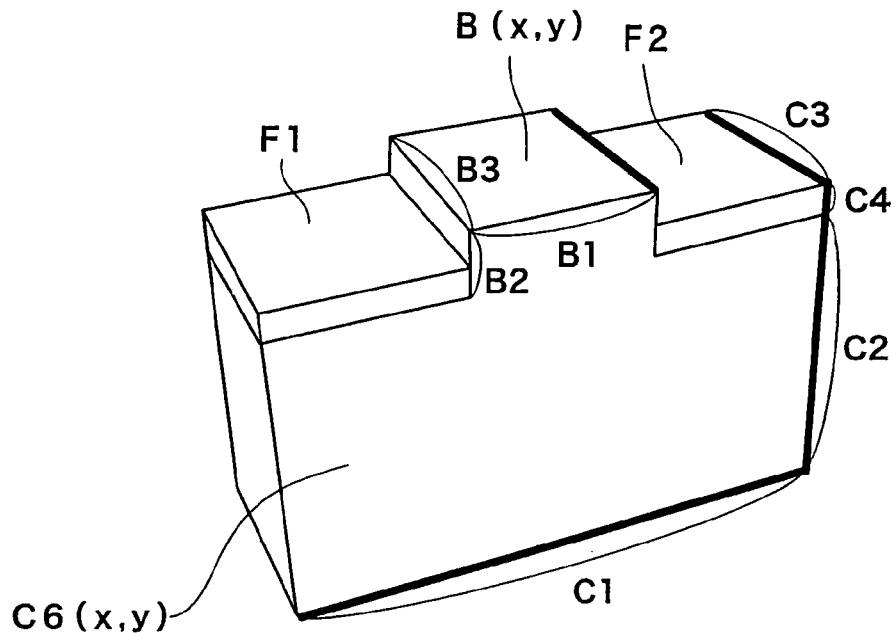
FIG. 31 is a perspective view of an example of the structure of a physical cell C6(x, y) of a first convex type embodiment of the present invention.
Figure 32:
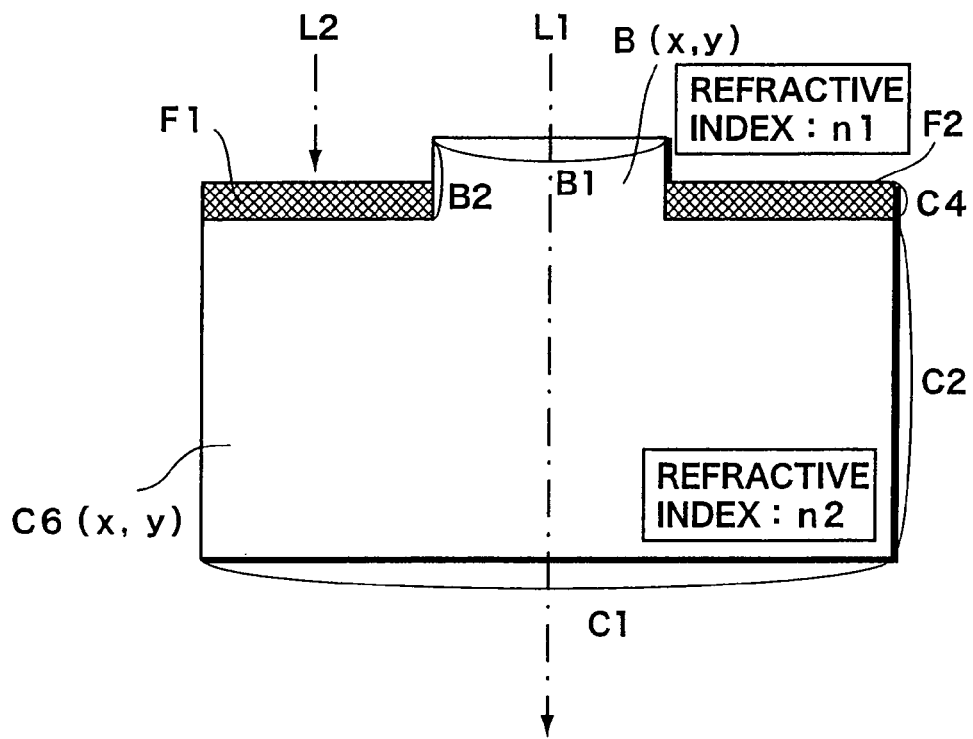
FIG. 32 is a sectional view of the physical cell shown in FIG. 31 (hatching of the main body portion of the cell is omitted).

Though examples, wherein a physical cell is arranged by forming a groove in a main cell body part, were described above, in carrying out the present invention, a convex part may be provided in place of a groove. FIG. 31 is a perspective view of an example of the structure of a physical cell C6(x, y) of a first convex type embodiment of the present invention, and FIG. 32 is a sectional view of this physical cell (hatching of the main body portion of the cell is omitted). Physical cell C6(x, y) shown here has substantially the same structure as physical cell C1(x, y) shown in FIG. 21 but differs in having a convex part B(x, y) formed in place of groove G(x, y). As illustrated, convex part B(x, y) is a rectangular parallelepiped structure with a width B1, a height B2, and a length B3. Here, area B1×B3 is set to a value that is in accordance with a specific amplitude defined in the cell and height B2 is set to a value that is in accordance with a specific phase defined in the cell. As with physical cell C1(x, y), shown in FIG. 21, light blocking layers F1 and F2 are formed at portions of the cell's upper surface besides convex part B(x, y). As shown in FIG. 32, whereas light L1, which has been transmitted through the interior of convex part B(x, y) becomes observed as a signal component, light L2, which is illuminated outside convex part B(x, y) is blocked by light blocking layers F1 and F2 and will not be observed as a noise component.

Physical cell C6(x, y), shown in FIG. 31 and FIG. 32, can also be used as a reflection type cell based on the principles shown in FIG. 10 (a type of cell with which illumination reconstruction light is illuminated from the upper side and observation is made from the upper side). That is, by arranging light blocking layers F1 and F2 as light absorbing layers and arranging the upper surface of convex part B(x, y) to be a reflecting surface, whereas light L1, which is reflected by the upper surface of convex part B(x, y) can be observed as a signal component light, light L2 that is illuminated outside convex part B(x, y) is absorbed by light blocking layers F1 and F2 and observation of light L2 as a noise component can thus be restrained.

Figure 33:
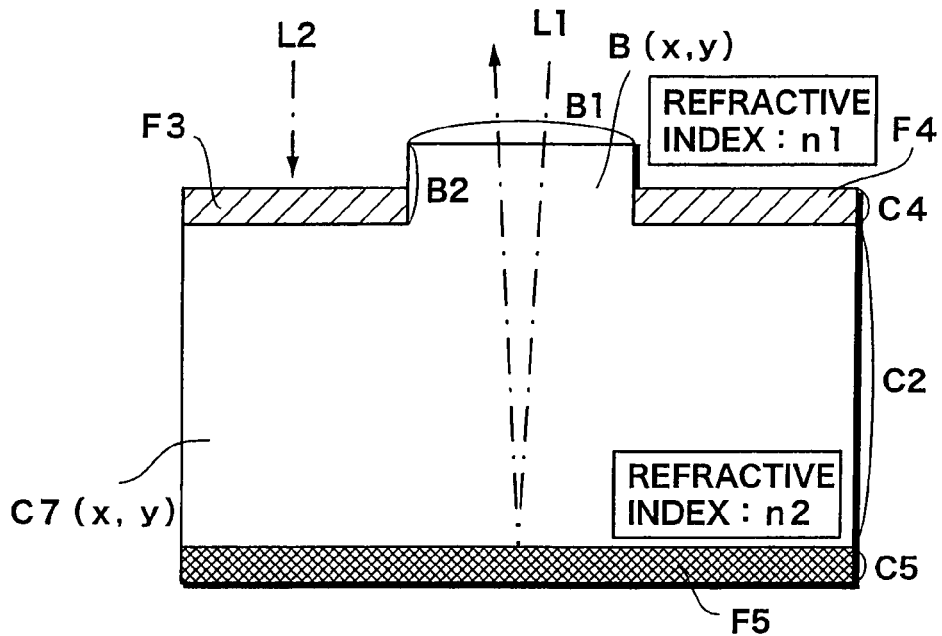
FIG. 33 is a sectional view of an example of the structure of a physical cell C7(x, y) of a second convex type embodiment of the present invention (hatching of the main body portion of the cell is omitted).
Figure 34:
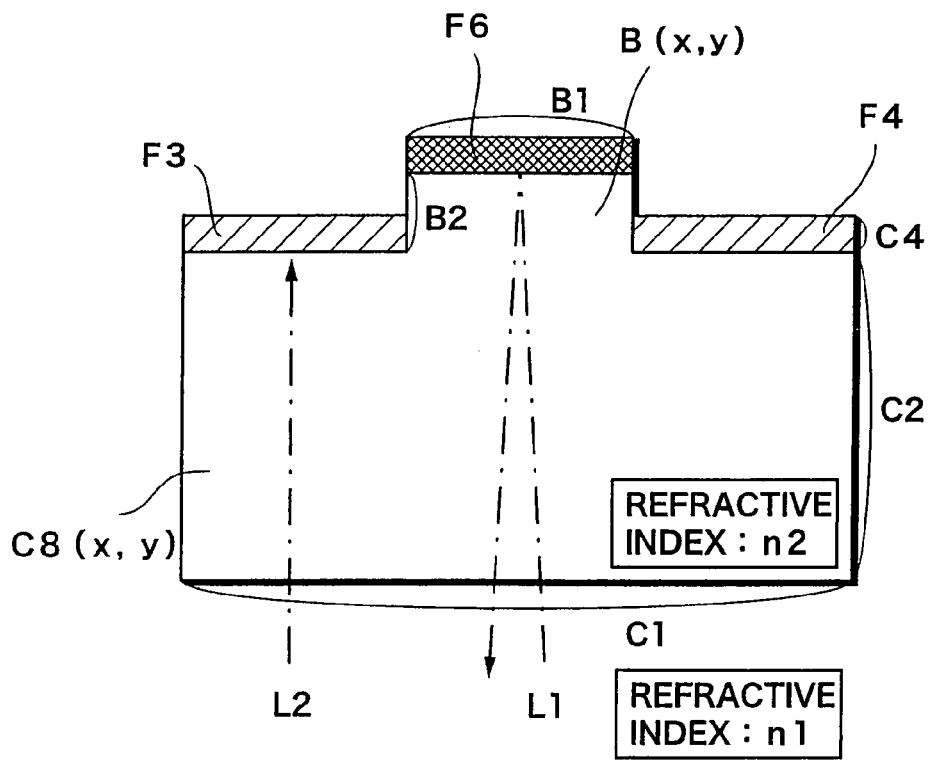
FIG. 34 is a sectional view of an example of the structure of a physical cell C8(x, y) of a third convex type embodiment of the present invention (hatching of the main body portion of the cell is omitted).

FIG. 33 is a sectional view of an example of the structure of a physical cell C7(x, y) of a second convex type embodiment of the present invention. Physical cell C7(x, y) shown here has substantially the same structure as physical cell C2(x, y) shown in FIG. 24 but differs in having convex part B(x, y) formed in place of groove G(x, y). Also, FIG. 34 is a sectional view of an example of the structure of a physical cell C8(x, y) of a third convex type embodiment of the present invention. Physical cell C8(x, y) shown here has substantially the same structure as physical cell C3(x, y) shown in FIG. 26 but differs in having convex part B(x, y) formed in place of groove G(x, y). In all cases, the difference is just due to having groove G(x, y) or having convex part B(x, y) and the basic functions are the same.

Also, though unillustrated here, a convex type embodiment provided with a convex part in place of groove GG(x, y) can be realized in regard to physical-cell CC(x, y), shown in FIG. 29.

<<<§ 7. Method for Manufacturing an Optical Element of the Present Invention>>>

Lastly, an example of a method for manufacturing the optical element of the present invention shall be described. As was described in § 6, the optical element of the present invention is arranged by aligning a plurality of three-dimensional cells. Each cell has a specific amplitude and a specific phase defined therein, has a groove part or a convex part formed in accordance with the specific amplitude and the specific phase, and requires that a light blocking layer, light absorbing layer, light reflecting layer, etc., be formed at portions of the upper surface except the groove part or the convex part.

Figure 35:
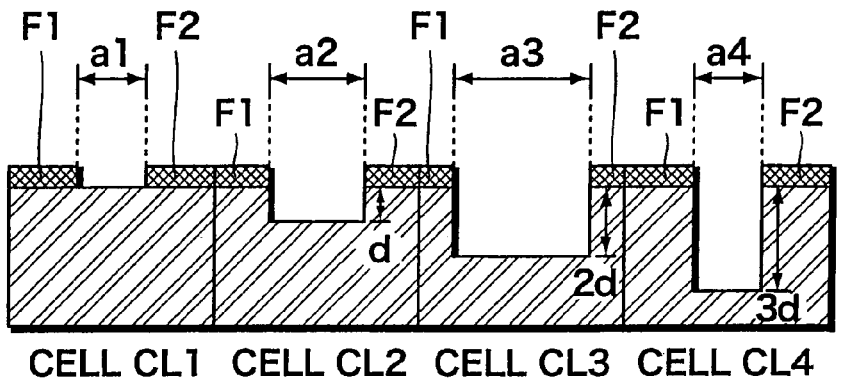
FIG. 35 is a sectional view of a simple model of an optical element by the present invention.

A semiconductor manufacturing art is preferably employed to mass-produce an optical element with such characteristics in an industrial scale. Semiconductor manufacturing arts are suited for fine processing and are also suited for industrial mass production. An example of a method for manufacturing the optical element of the present invention shall now be described for a model illustrated by the sectional view of FIG. 35. The model shown in FIG. 35 is that of a simple optical element, wherein four kinds of three-dimensional cells are aligned one-dimensionally. Though obviously such a simple optical element cannot provide the function of a proper optical element, an example of a manufacturing process shall be described here based on such a simple model here for the sake of convenience of description.

In the optical element shown in FIG. 35, four cells of the same type as transmission type physical cell C1(x, y), shown in FIG. 21, are aligned, and in each of the four cells CL1 to CL4, a specific amplitude and a specific phase are defined. That is, each specific amplitude corresponds to the area of the opening of a groove and each specific phase corresponds to the depth of a groove. Also, light blocking layers F1 and F2 are formed at the surroundings of the grooves. Cell CL1 has formed therein a groove with a width a1 and a depth 0 (that is, a groove is practically not formed), cell CL2 has formed therein a groove with a width a2 and a depth $d$, cell CL3 has formed therein a groove with a width a3 and a depth $2d$, and cell CL4 has formed therein a groove with a width a4 and a depth $3d$. Here, it shall be deemed that the main body part of each cell is formed of a quartz glass substrate and light blocking layers F1 and F2 are formed of a chromium layer.

Figure 36A:
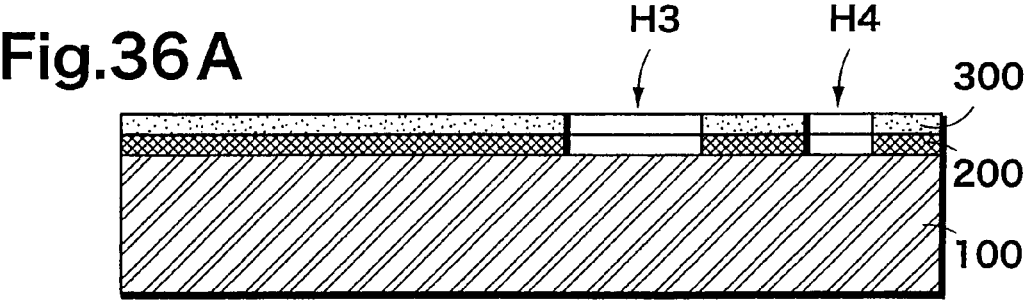
FIGS. 36A to 36C are sectional views of the stages of the first half of a process of manufacturing the model shown in FIG. 35.

An example of a process of manufacturing such an optical element shall now be described based on the sectional views of FIG. 36 and FIG. 37. First, as shown in FIG. 36A, a quartz glass substrate 100, which is to become the main cell body part, is prepared and a chromium layer 200 is formed over the entire upper surface. Sputtering, vapor deposition, or other general method may be used to form chromium layer 200. A resist layer 300 is then formed on the upper surface of chromium layer 200, and using a predetermined exposure mask, just the groove-forming regions of cells CL3 and CL4, at which grooves of depths $2d$ and $3d$ are required to be formed, are exposed. This resist layer 300 is developed and after removing the exposed parts, the remaining resist layer 300 is used as a mask and etching of chromium layer 200 is performed. FIG. 36A shows the state upon completion of such etching. Openings H3 and H4 are thus formed in resist layer 300 and chromium layer 200. Here, opening H3 is formed at the position of the groove that is to be formed in cell CL3, and opening H4 is formed at the position of the groove that is to be formed in cell CL4. A general method, such as dry etching using a chlorine-based gas or wet etching using perchloric acid and cerium (IV) diammonium nitrate, may be used to etch chromium layer 200.

Figure 36B:
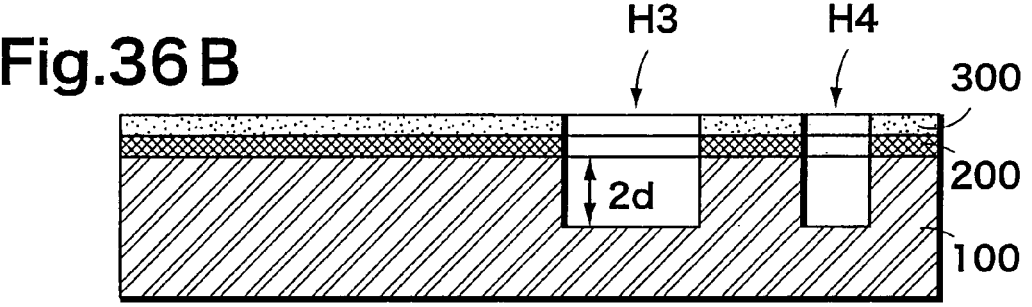
Figure 36C:
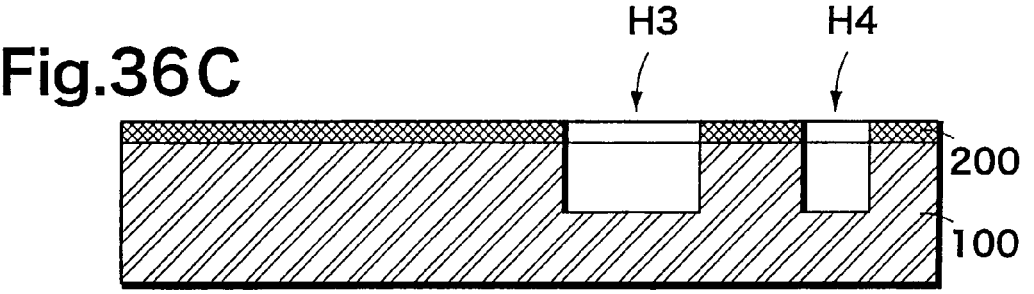

Etching of quartz glass substrate 100 is then performed in the state shown in FIG. 36A to form grooves of depth $2d$ at the portions of openings H3 and H4. FIG. 36B shows the state upon completion of such etching. A groove of depth $2d$ is formed at both the portion of opening H3 and the portion of opening H4. Such etching can be carried out by a dry etching process using $CF_4$ or other fluorine-based gas. When the grooves are thus formed, resist layer 300 is peeled off once at this point. FIG. 36C shows the state after the peeling off of resist layer 300.

Figure 37A:
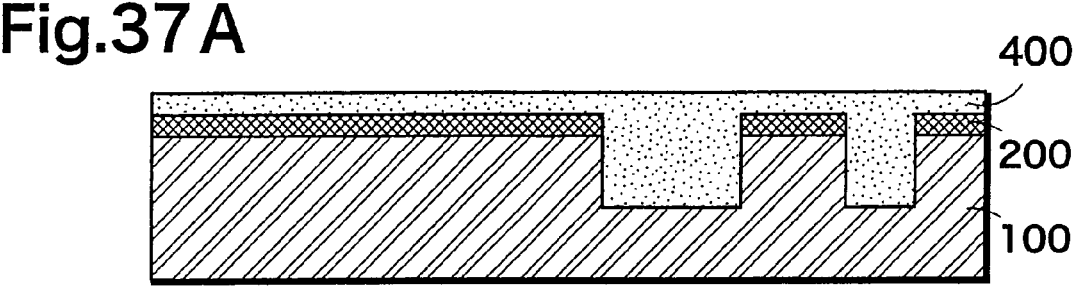
FIGS. 37A to 37D are sectional views of the stages of the latter half of the process of manufacturing the model shown in FIG. 35.
Figure 37B:
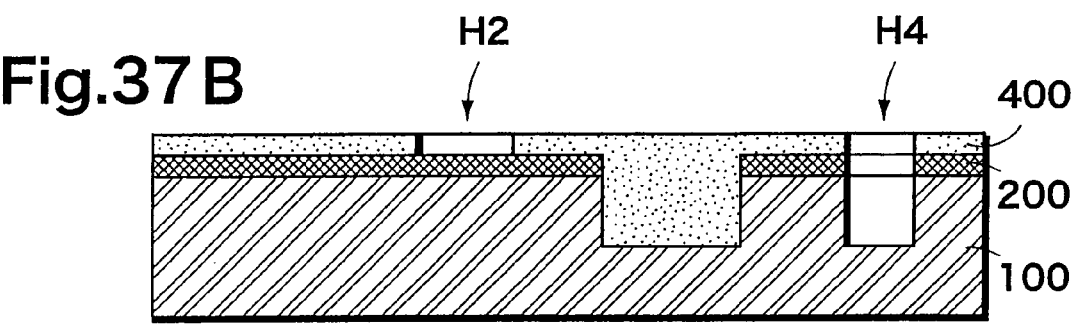
Figure 37C:
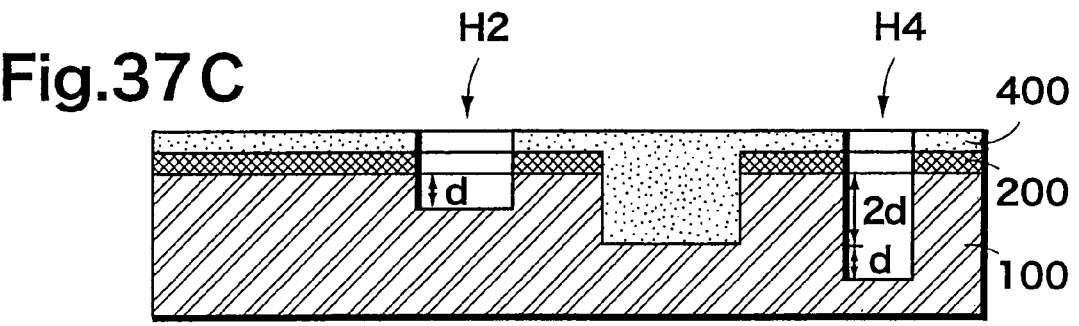
Figure 37D:
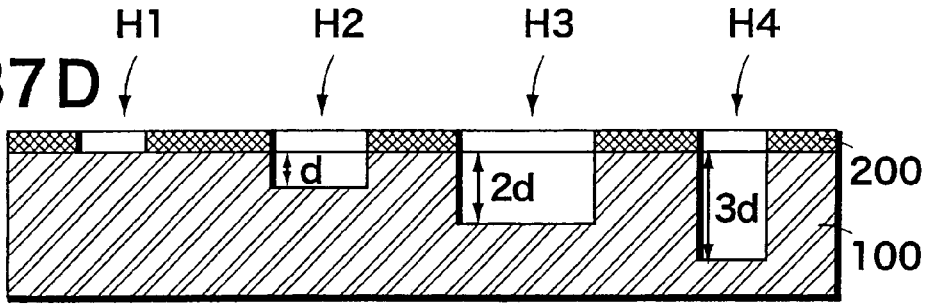

A resist layer 400 is then formed on the entire upper surface of the substrate again. FIG. 37A shows the state immediately after the forming of resist layer 400. As illustrated, resist layer 400 fills even the interiors of the grooves that have been formed in the previous steps. Then using a predetermined exposure mask on this resist layer 400, just the groove-forming regions of cells CL2 and CL4 are exposed. When this resist layer 400 is exposed and the exposed parts are removed, the state shown in FIG. 37B is reached in which openings H2 and H4 are formed. Here, opening H2 is formed at the position of the groove that is to be formed in cell CL2 and opening H4 is formed at the position of the groove that is to be formed in cell CL4. By then performing etching on chromium layer 200 again, the chromium layer 200 inside opening H2 can be removed. Etching of quartz glass substrate 100 is thus performed again on the internal regions of openings H2 and H4 to hollow the portions of openings H2 and H4 by just a depth d. FIG. 37C shows the state upon completion of such etching. A groove of depth d is formed at the portion of opening H2, and at the portion of opening H4, a groove of depth $3d$ is formed by the groove of depth $2d$, which existed originally, being hollowed further by just depth d.

Lastly, the portion of resist layer 400 at the position of the groove to be formed in cell CL1 is exposed and removed to form an opening H1 and the chromium layer 200, corresponding to this opening H1, is removed by etching. In the final stage, by peeling off the entire remaining resist layer 400, the structure shown in FIG. 37D can be obtained. This structure is none other than the optical element shown in FIG. 35.

With the above-described manufacturing process, chromium layer 200 can be used as the mask in the step of etching quartz glass substrate 100, and moreover, chromium layer 200 that remains at the final stage can be used as the light blocking layer that is formed on the upper surface of the cells. The process of exposing the resist layer will be a process of exposing a considerably fine pattern. Thus for practical purposes, an electron beam drawing device is preferably used. Also, though a process of forming cells with four different depths (0, d, $2d$, and $3d$) was described with the above example, in the case where cells of a larger number of types of depths are to be formed, the process of etching quartz glass substrate 100 is repeated further.

With the optical element of the present invention, since each individual three-dimensional cell has a function of recording both an amplitude and a phase, both the amplitude and phase that are recorded in each individual cell can be reproduced in the reconstruction process. The optical element of the present invention can thus be used not only as a hologram for reconstructing a three-dimensional image but can also be used as an optical element in various applications. For example, this optical element can be used in such applications as a beam shaper, an optical branching element, an optical element for an exposure device, a processing mask, a directional diffuser plate, a directional reflection plate, an image projecting element, and an image synthesizing element (glasses, fan, camera filter, etc.) as well.

The invention claimed is:

1. An optical element comprising a set of a plurality of three-dimensional cells:
    wherein an individual cell is made of a light transmitting material and has a specific amplitude and a specific phase defined therein;
    a first region, comprising a portion with an area that is in accordance with the specific amplitude defined in the individual cell, and a second region, comprising a portion except the first region, are defined on an upper surface of the individual cell, the first region on the upper surface of the individual cell being formed by a bottom surface of a groove, having a depth that is in accordance with the specific phase defined in the individual cell, a light absorbing layer being formed on the second region on the upper surface of the individual cell, and a light reflecting layer being formed on a bottom surface of the individual cell; and
    the individual cell has a specific optical characteristic such that when predetermined incident light is provided from the upper surface of the cell, reflection emitted light, with which amplitude and phase of the incident light have been changed in accordance with the specific amplitude and the specific phase defined in the cell, is obtained from the upper surface of the cell.

2. The optical element according to claim 1, wherein:
    an individual cell is arranged by forming, on a base having a first rectangular parallelepiped shape, a groove with a second rectangular parallelepiped shape that is smaller than the first rectangular parallelepiped shape.

3. The optical element according to claim 2, wherein:
    individual cells are aligned in a form of a two-dimensional matrix with respective upper surfaces being directed upward.

4. The optical element according to claim 1, wherein:
    a complex amplitude distribution of object light from an object image is recorded so that the object image is reconstructed upon observation from a predetermined viewing point position thus to use said optical element as a hologram.

* * * * *